(12) United States Patent
Abraham

(10) Patent No.: US 7,503,283 B2
(45) Date of Patent: Mar. 17, 2009

(54) AQUATIC EGG COLLECTION RESEARCH SYSTEM AND RELATED DEVICES FOR IMPLEMENTING THE SYSTEM

(76) Inventor: Nathaniel Abraham, 412 Sussex St., Lynchburg, VA (US) 24501

( * ) Notice: Subject to any disclaimer, the term of this patent is extended or adjusted under 35 U.S.C. 154(b) by 403 days.

(21) Appl. No.: 11/257,209

(22) Filed: Oct. 24, 2005

(65) Prior Publication Data

US 2006/0102086 A1    May 18, 2006

Related U.S. Application Data

(60) Provisional application No. 60/621,967, filed on Oct. 24, 2004, provisional application No. 60/621,966, filed on Oct. 24, 2004, provisional application No. 60/621,965, filed on Oct. 24, 2004, provisional application No. 60/621,877, filed on Oct. 24, 2004.

(51) Int. Cl.
    *A01K 61/00* (2006.01)
(52) U.S. Cl. .................................... 119/217; 119/225
(58) Field of Classification Search ................ 119/217, 119/224, 225, 245, 455, 458
    See application file for complete search history.

(56) References Cited

U.S. PATENT DOCUMENTS

| | | | | |
|---|---|---|---|---|
| 3,122,126 A | * | 2/1964 | Yamada | ............... 119/225 |
| 3,797,458 A | * | 3/1974 | Day et al. | ................ 119/209 |
| 4,038,945 A | * | 8/1977 | Taborsky | ................ 119/224 |
| 5,189,981 A | * | 3/1993 | Ewald, Jr. | ................ 119/225 |
| 5,197,409 A | * | 3/1993 | Hammond | ................ 119/253 |
| 5,365,886 A | | 11/1994 | Frost, Jr. | |
| 5,469,810 A | * | 11/1995 | Chiang | ................ 119/248 |
| 5,894,936 A | * | 4/1999 | Sanders et al. | ................ 209/270 |
| 6,125,791 A | | 10/2000 | Gundersen et al. | |
| 6,257,170 B1 | | 7/2001 | Gundersen | |
| 6,588,371 B2 | | 7/2003 | Hallock et al. | |
| 2003/0094142 A1 | | 5/2003 | Boschert | |
| 2004/0251186 A1 | | 12/2004 | Ohanian | |

* cited by examiner

Primary Examiner—Yvonne R. Abbott

(57) ABSTRACT

The application is directed to an aquatic egg collection research system. The egg collection includes stepped racks that hold a plurality of tanks in a stepped configuration. A stepped fluid conduit assembly and stepped drain respectively supply water to the tanks and collect water flowing out from the tanks. A barrier partitions the tanks enabling eggs to fall through but prevents the adult fish from scavenging the eggs. Nets are placed by a user in strategic areas for trapping eggs from the water flowing out from the tanks. In some embodiments, the tanks are totally opaque, internally lighted, and have an electronic timer for controlling the internal lighting in the tanks. The eggs can be studied with various microscopic slides customized for the research.

12 Claims, 23 Drawing Sheets

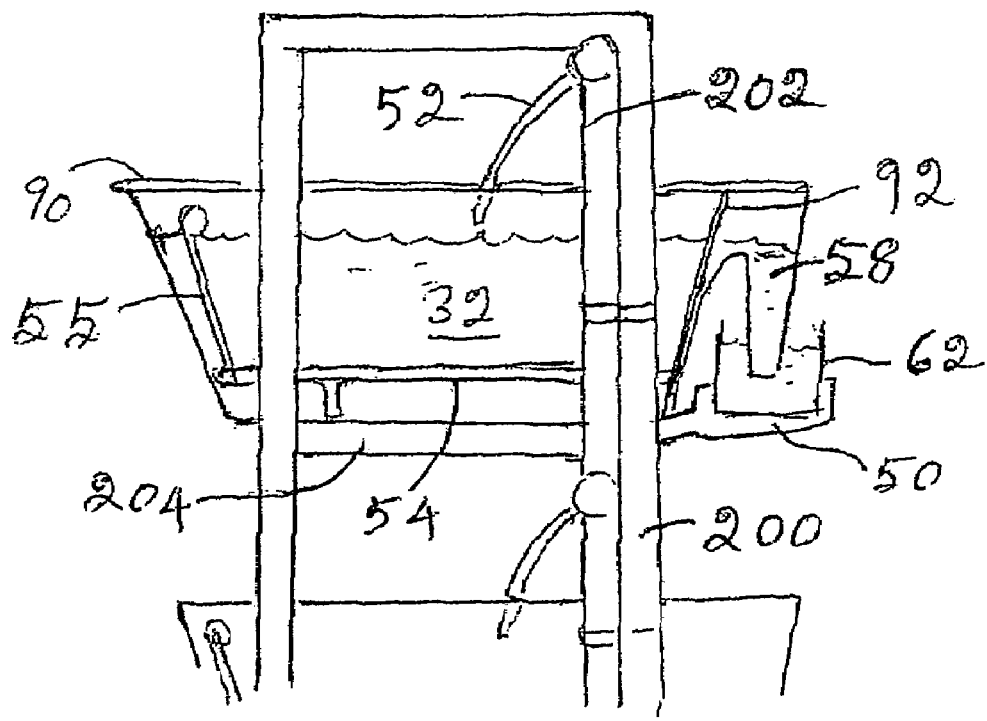
FIG 2
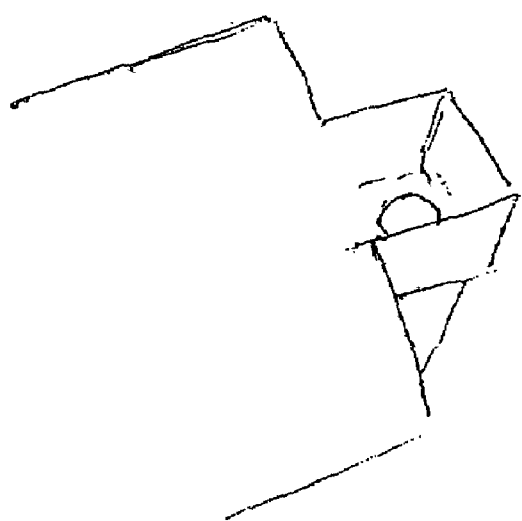

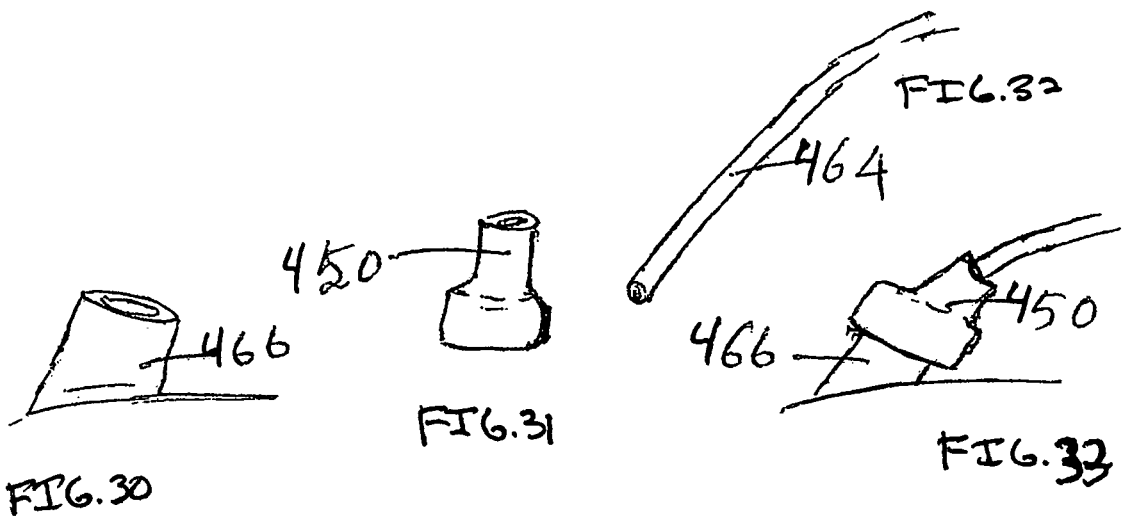
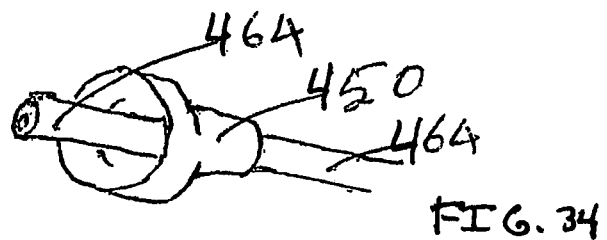
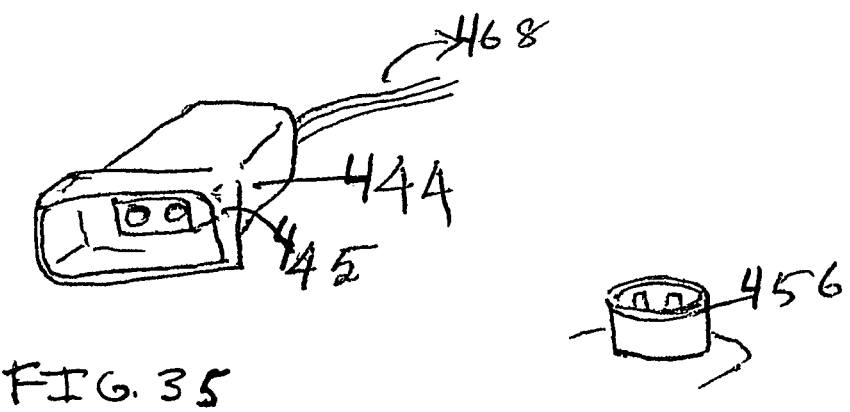

AQUATIC EGG COLLECTION RESEARCH SYSTEM AND RELATED DEVICES FOR IMPLEMENTING THE SYSTEM

CROSS-REFERENCE TO RELATED APPLICATIONS

This application claims the benefit of U.S. Provisional Application No. 60/621,965, filed Oct. 24, 2004, U.S. Provisional Application No. 60/621,877, filed Oct. 24, 2004, U.S. Provisional Application No. 60/621,966, filed Oct. 24, 2004, and U.S. Provisional Application No. 60/621,967, filed Oct. 24, 2004, which are all hereby incorporated by reference in their entirety.

TECHNICAL FIELD OF THE INVENTION

The claims relate to an aquatic egg collection research system and devices for implementing the system, particularly, but not exclusively, to an aquatic housing and egg collection apparatus especially pertaining to zebrafish housing and breeding and related slides for the research of the eggs.

BACKGROUND OF THE INVENTION

Several fish species such as the medaka, fugu and zebrafish have become popular as models organisms for developmental studies. Some of the reasons for their popularity are, they are vertebrates (hence more significant to human research than invertebrate models such as fruit flies), and they have short developmental periods. And since these fishes lay eggs, they allow studies on development of the embryos (inside the eggs) outside of the mother's body. Of these models, the zebrafish is increasingly becoming the model of choice for many researchers. The egg laying in these fishes, can be manipulated using artificial light and periods as females lay their transparent eggs within about an hour after the light comes on (i.e., 'dawn') after a dark cycle. An electronic timer usually controls the light cycles in 14 h light and 10 h dark cycles in the environment in which the fish are housed. Noting the popularity of fish models, several manufacturers have developed aquatic housing where these models can be raised.

Rack type fish housing has been available from many manufacturers in which clear tanks are used to rear fishes. The advantage in such a system is that a plurality of clear tanks can be placed on the racks. That the tanks are clear allows a common light source to be used for all the tanks. But a significant disadvantage is that all tanks are subject to the same light cycle as the room or chamber (or within curtains) in which they are housed with the common lighting source. Thus if the 'dawn' is set to come at 10 A.M., then eggs are laid from about 10-11:30 A.M. in all the tanks in that rack. An egg laid and fertilized at about 10 A.M. will have 3 hours of growth post fertilization at about 1 P.M. on the same day. If a researcher or user wishes to observe egg development at say 12 hours post fertilization in a rack unit whose 'dawn' is at 10 A.M., then the researcher will need to come at 10 P.M. of the same day, thus posing a severe inconvenience. Similarly, some researchers may come in at an earlier time to 10 A.M., but will have to wait till 10 A.M. or later to collect eggs from any tank.

In addition, none of the systems conveniently integrate fish housing with harvesting eggs or embryos. Eggs are often the only purpose for which the fish are maintained and hence lack of an integral ability to conveniently collect them or automate the process of collecting them constitutes a substantial drawback in the art. For instance, in some of the prior art, a bed of marbles is laid in the tanks where the fish are housed by a researcher (user), which prevents the eggs that are laid from being eaten by adult fish. In this arrangement, the eggs are harvested by the researcher using a gravity driven siphon. The siphoned eggs are collected in a net and transferred to a suitable tank or container. Alternatively, a small dish or similar container with a net stretched across its open face maybe placed by the researcher/user within the tanks. The net has mesh of a size (say 2-5 mm) that prevents the adult fishes from scavenging the eggs, while allowing the laid eggs to drop below the net and into the container. In this case, after the eggs are laid (within about an hour after 'dawn'), the user physically removes the dish containing the eggs from the tanks.

Both these arrangements require frequent physical intrusions by the researcher on the fish habitat for purpose of harvesting eggs, an inconvenience for the researcher as well as stressing the fish, thereby affecting their well being. Also, toxins or foreign substances could be unwittingly introduced by the researcher into the water whenever eggs are harvested by this method. In the same token, any infection or toxin in the water could potentially affect the researcher.

Moreover, researching these eggs includes many drawbacks. The embryos of the fish are transparent and can be observed under a microscope if placed on a small drop of water or suitable solution. There is no slide that allows easy visualization of these embryos.

Therefore, needs remain in this area of technology.

BRIEF SUMMARY OF THE INVENTION

One aspect of the invention includes an apparatus for collecting aquatic animal eggs. The apparatus includes a plurality of tanks for containing animals that are capable of laying eggs, each tank including a spout for enabling fluid to flow out of the tank. The apparatus also includes a rack having a plurality of level sections for supporting the tanks, wherein at least one of the level sections is stepped down from another level section. In addition, the apparatus includes a fluid conduit assembly for introducing a fluid into the plurality of tanks to flow out the spouts of each tank. Further, a plurality of stepped drains is in fluid communication with the spouts of the tanks. Also, the apparatus includes at least one removable net operatively coupled in-line with a fluid flow from at least one tank to capture the eggs from the at least one tank.

Another aspect of the invention includes a tank for holding animals that are capable of laying eggs. The tank includes an opaque housing defining an interior space for holding a fluid and at least one animal capable of laying eggs. The opaque housing includes an open top and an opaque spout for draining the fluid out of the tank. The housing also includes an opaque lid for covering the open top of the opaque housing. Furthermore, the device includes a light source for selectively providing light into the interior space of the housing at predetermined time periods.

Yet a further aspect of the invention is a method for collecting eggs from aquatic animals. The method includes providing a plurality of tanks for holding animals that are capable of laying eggs and a fluid conduit assembly for circulating fluid through the tanks. In addition the fluid conduit assembly includes a plurality of movable nets and each movable net correspondes to a tank. The method also includes positioning each movable net to strain fluid flow from a particular tank. In addition, the method includes selectively moving the movable nets to either isolate or combine the fluid flowing out of the tanks to selectively collect the eggs from one or more of the tanks.

Another aspect of the invention includes a spout net for straining fluid flow from a spout on a tank. The spout net includes a clip biasing a first and second handle in a predetermined direction. The spout net also includes a clasper coupled to at least one of the handles for surrounding at least a portion of the spout. In addition, the spout net includes a net operatively coupled to the clasper for straining the fluid flow leaving the spout.

BRIEF DESCRIPTION OF THE DRAWINGS

FIG. 2 illustrates a side elevational view of the rack as well as a tank belonging to the upper row.

FIG. 30 illustrates a side view of the water inlet in the lid illustrated in FIG. 25.

FIG. 31 illustrates a perspective view of the cuff for the water inlet of FIG. 30.

FIG. 32 illustrates a perspective view of the water feed tube for use with the cuff of FIG. 31.

FIG. 33 illustrates a side view of the water feed tube of FIG. 32 connected to the water inlet of FIG. 30 having the cuff of FIG. 31 covering the water inlet.

FIG. 34 illustrates a perspective view of the water feed tube of FIG. 32 including the cuff of FIG. 31.

FIG. 35 illustrates a perspective view of a water shielded electric plug.

FIG. 36 illustrates a perspective view of the plug in the lighting unit of FIG. 27.

DETAILED DESCRIPTION OF THE ILLUSTRATED EMBODIMENTS

The descriptions contained here are meant to be understood in conjunction with the drawings that have been provided.

Figure 1:
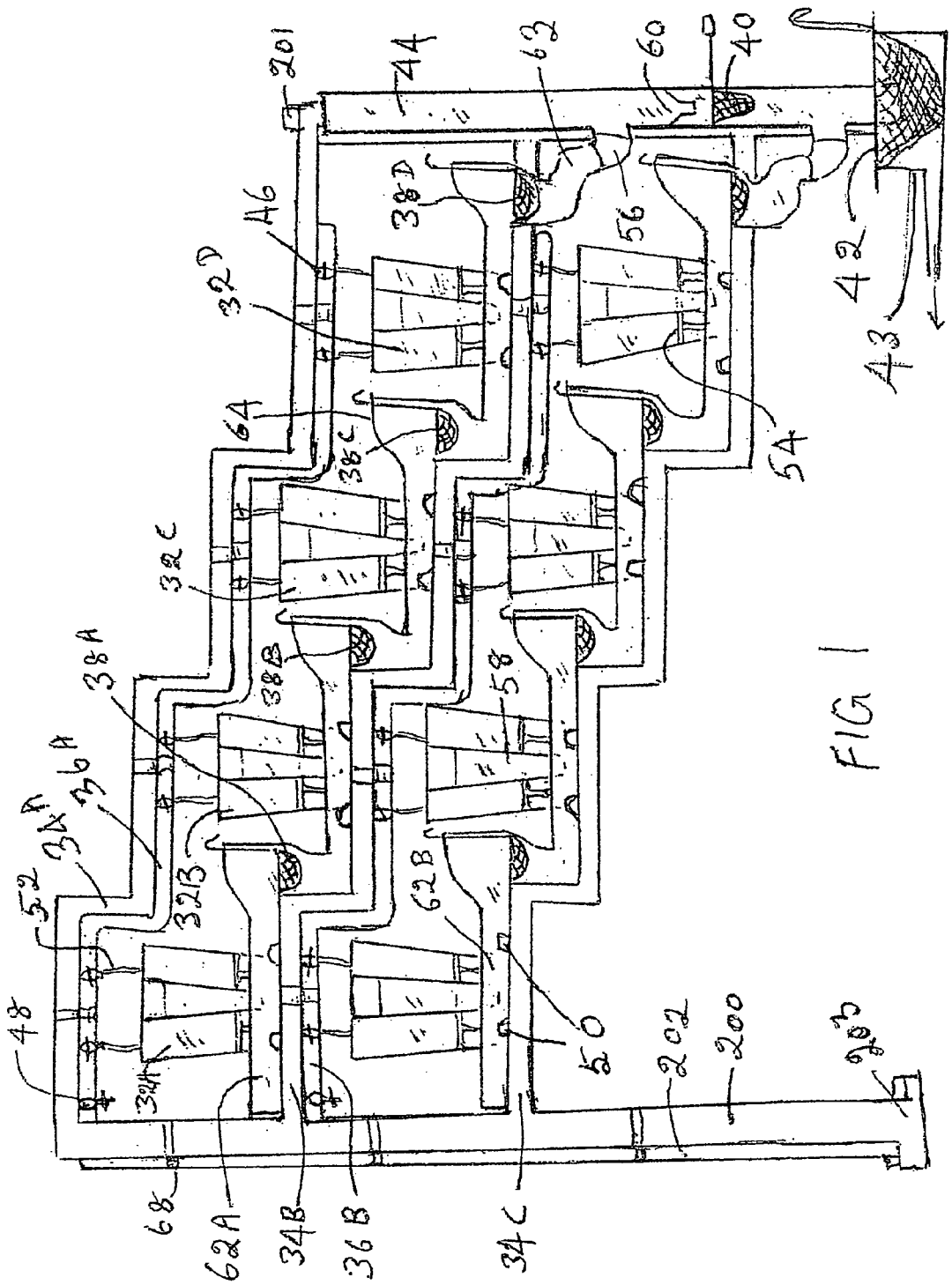
FIG. 1 illustrates a front elevational view of one preferred embodiment of an egg collection apparatus.

FIG. 1 shows a front elevation of my invention. The tanks, generally depicted 32, are placed in rows of stepped racks generally depicted 34. The rack 34 is made of a material such as stainless steel, titanium or even composites that are corrosion resistant and can support a plurality of tanks 32 carrying water. The rack surface should preferably be non-toxic to the fish. Three levels of stepped racks 34 have been designated as 34A, 34B and 34C. Each stepped rack attaches to the vertical components of the frame on either side, 200 and 201 which are preferably made of a material similar to the stepped racks 34. The stepped racks 34 can be welded (i.e., especially if made of a metal) or attached removably on the vertical end racks 200 and 201. Alternatively, all components may be manufactured as one frame. At each level of stepped rack 34, two or more than two stepped racks 34 can attach side by side to the end racks 200 and 201. Alternatively a single thick sheet of a suitable material such as steel can be used to form the stepped rack 34. In an alternate embodiment, the stepped racks can also be additionally supported by struts from a horizontal rack attached, for instance at the top of the vertical racks 200 or 201. Also in an alternative embodiment, the stepped racks 34 can be angled so as to slope gradually to the vertical drain 44. The vertical and horizontal components of the stepped rack constituting each step preferably meet at right angles or can deviate slightly from a right angle. The vertical components of the frame 200 and 201 are preferably attached together by crossbeams 204 to give greater stability to the unit. Crossbeams, either removable or permanent, can also be used between the stepped racks 34. The end racks 200 and 201 are supported on a matrix of feet 203, or trusses to ensure maximum stability. In general, the racks have to accommodate and support a plurality of tanks 32 placed on it as well as other components described below in a stepped configuration. Other embodiments of the rack are also possible that can support tanks and other components such as the drain and water supply in a stepped configuration, which is an important requirement for my egg collection research system. One alternate embodiment for the stepped racks is a vertical stand having rows of brackets that step down in level from one side of the frame to the other. Similarly, several stands having brackets at different levels can also be made. In the alternate embodiment, the brackets are spaced so as to support a plurality of tanks and components in tiers. Brackets are placed at different levels so that the tanks are held in a higher level in one bracket and are at a lower level in the adjacent bracket thereby creating a stepped configuration. Other components such as the stepped drain and water conduits can also be used with this alternate embodiment with suitable support from the brackets.

Figure 10:
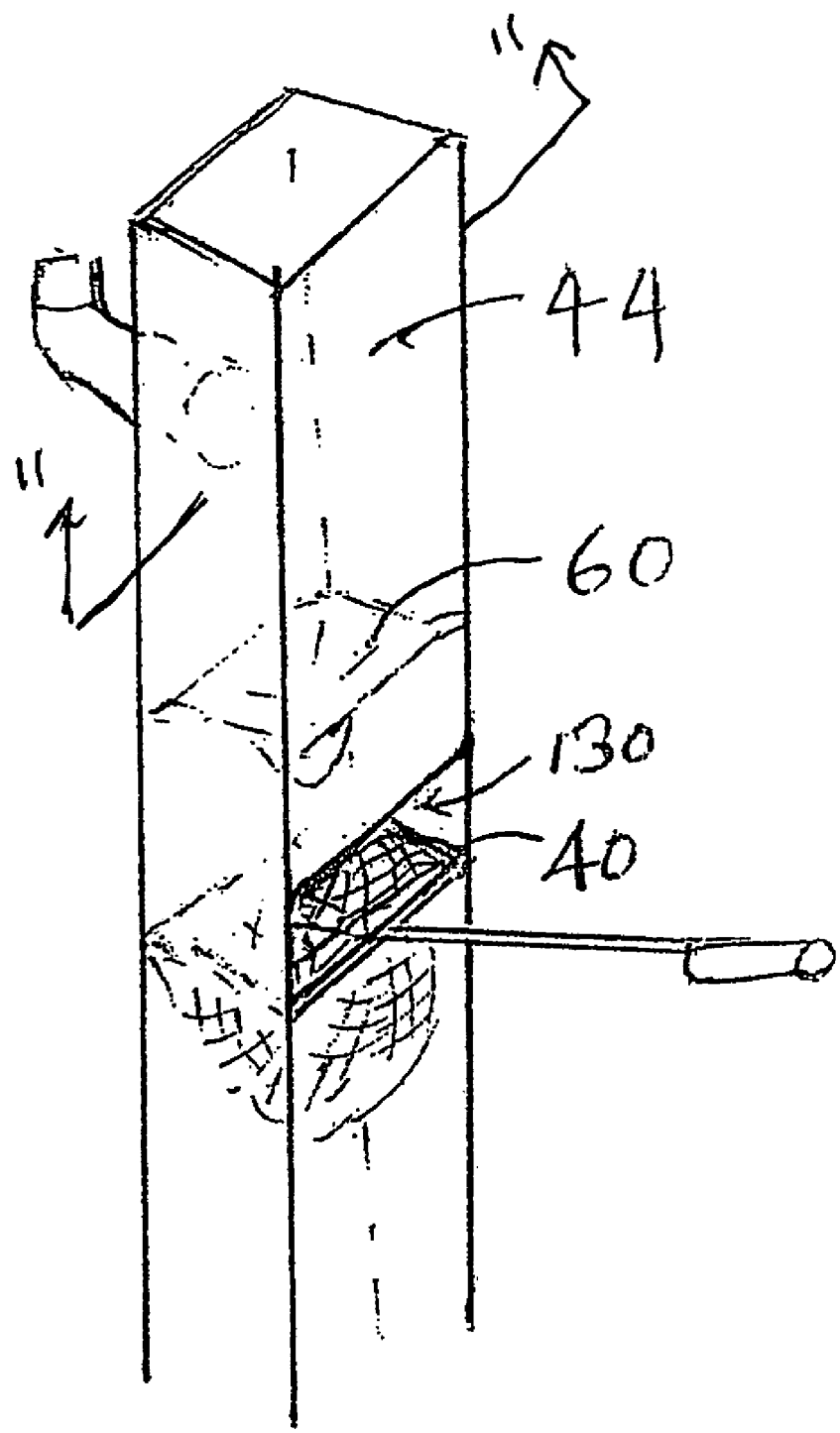
FIG. 10 illustrates a perspective view of the common vertical drain showing provision for inserting a removable net to trap eggs.
Figure 11:
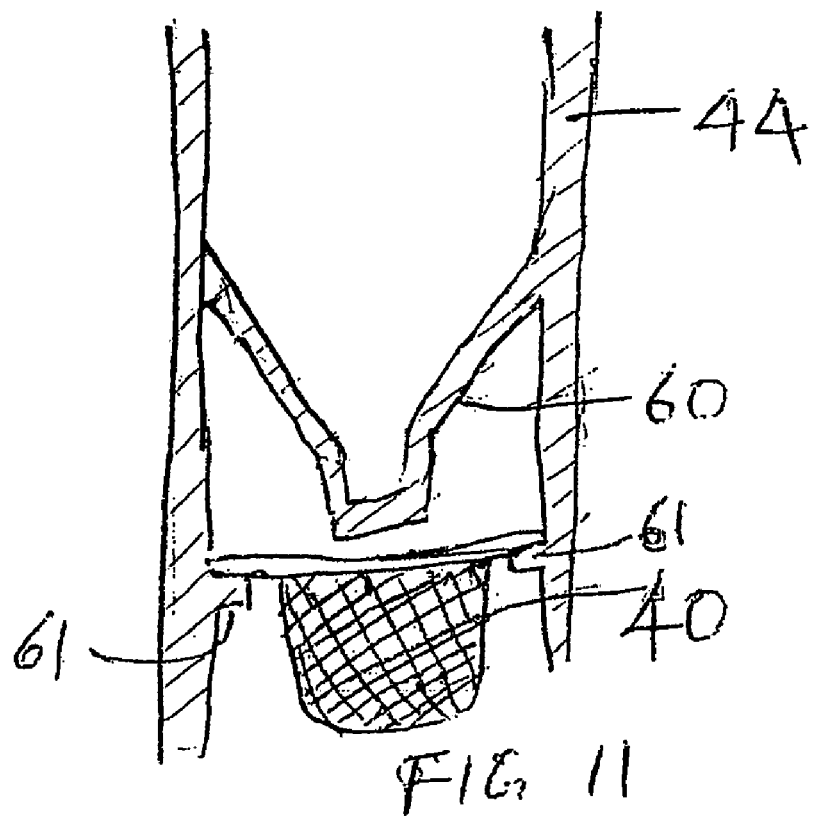
FIG. 11 illustrates a cross sectional view through the line 11-11 of the common vertical drain illustrated in FIG. 10 showing the provision for funneling water into the net as well as ledges for suspending the net in the drain.

In the preferred embodiment, the stepped racks 34, also support water supply conduits generally designated 36 to the tanks 32. The water supply conduits 36 generally provide fluid to be circulated to the rest of the fluid conduit assembly. The fluid conduit assembly can be any combination of conduits and drains to circulate the fluid in and out of the tanks 32. In addition, in the illustrated embodiment, the fluid conduit assembly includes structure for controlling and adjusting the flow of the fluid through the assembly. Reference characters 36A and 36B indicate two water supply conduits at two levels both of which are supplied by aerated, clean water by vertical conduit 202 (FIG. 1, FIG. 2). The water conduits 36 generally follow the shape of the rack 34 before termination. Water conduits are generally secured to the racks by means of ties 68 or similar means such as brackets from the stepped racks. The conduit 36 have openings gated by valves 46, throughout their length which are suitably positioned so as to open into feed pipes generally designated 52, that in turn supply the tanks 32. More than one feed pipe 52 can supply water to each tank. Main valve 48 gates water supply to each level of water conduits 36. Brackets 50 (FIG. 1, FIG. 2) arise from the stepped racks 34 closest to the user in FIG. 1, which support the placement of the stepped drains generally designated 62 (FIG. 1, FIG. 2, FIG. 3, FIG. 4). Two stepped drains 62 A and 62 B at two levels collect water flowing from spouts 58 of individual tanks 32 and empty into vertical drain 44, (FIG. 1, FIG. 10, FIG. 11). The water from the stepped drain 62 flows via a bent tubular portion 63 of the stepped drain, which joins with a connector 56 that in turn empties into a water reservoir or sump 43(FIG. 1). The exiting water is treated by a series of modules (not shown and not necessarily arranged in the order given) such as particle filters, UV filters, biological filters, carbon filters, aerators, pump etc, before re-entering circulation through supply conduit 202. Alternatively, fresh water can be supplied through 202 as opposed to re-circulating water. Also, in an alternate embodiment, each tank may be individually supplied with air from suitably placed air supply tubes.

The tanks 32 in some embodiments are transparent and made of polycarbonate, however, in other embodiments opaque tanks, such as those described here in below with respect to FIGS. 25-45, are used. If transparent tanks are used, they can be procured from manufactures such as Aquatic Habitats™, a division of Aquatic Eco-systems of Apopka, Florida or Allentown Caging Equipment Company, Inc of Allentown, N.J.etc. Generally the tanks are available at sizes ranging from about 1-10 liters or more. The tanks 32 come with a baffle 92 (FIG. 2, FIG. 5, FIG. 6) and a lid 90 (FIG. 2, FIG. 5) with holes for letting in food/air, water feed pipes 52 and a spout 58 to facilitate draining of water. The baffle 92, functions to draw water from the bottom of the tanks, thereby facilitating the drainage of sediments and other material from the bottom of the tank 32; thus baffles are employed by these units to aid the self cleaning of the tanks. While the tanks given in these illustrations have almost a rectangular base, other types of tanks of various shapes can also be accommodated in the rack.

Figure 5:
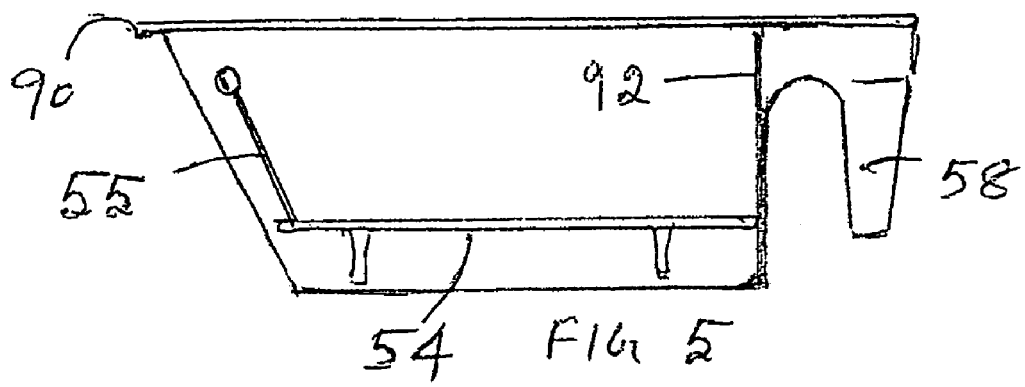
FIG. 5 illustrates a side elevational view of a tank according to one embodiment.
Figure 6:
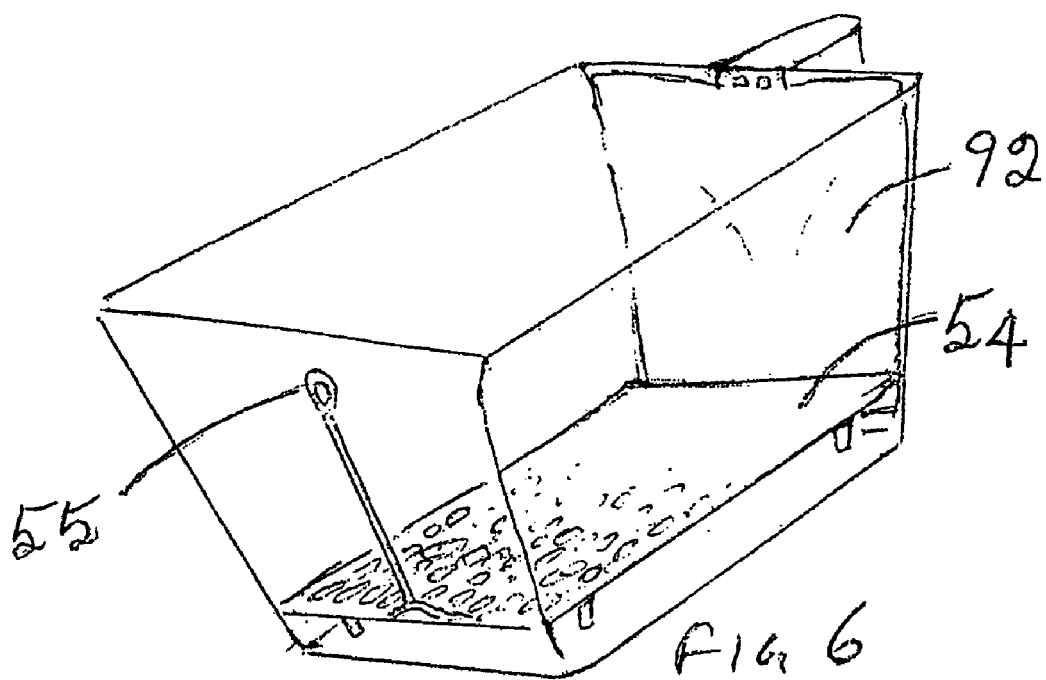
FIG. 6 illustrates a perspective view of a tank according to one embodiment.
Figure 7:
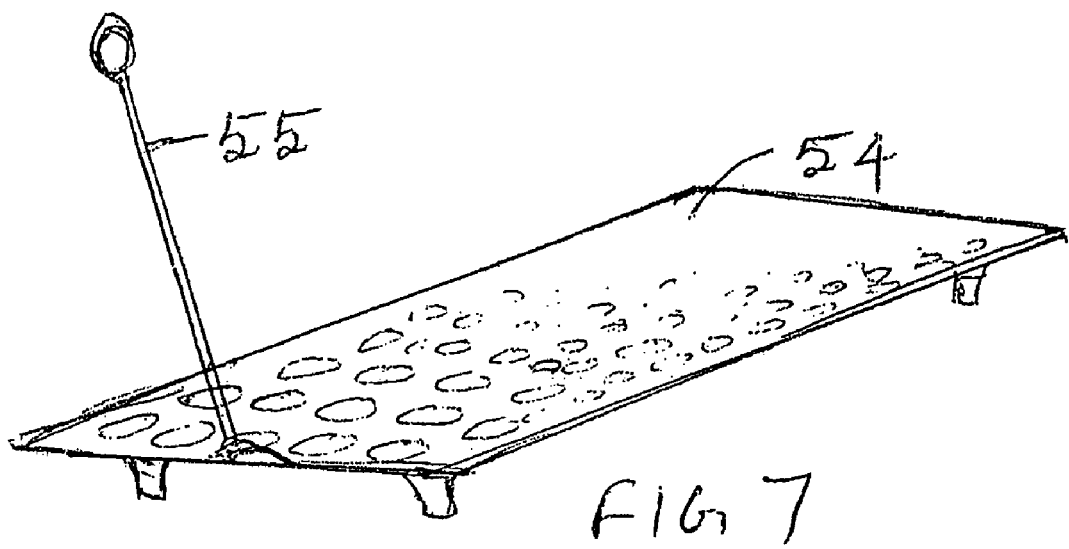
FIG. 7 illustrates a perspective view of an adult fish barrier according to one embodiment.
Figure 8:
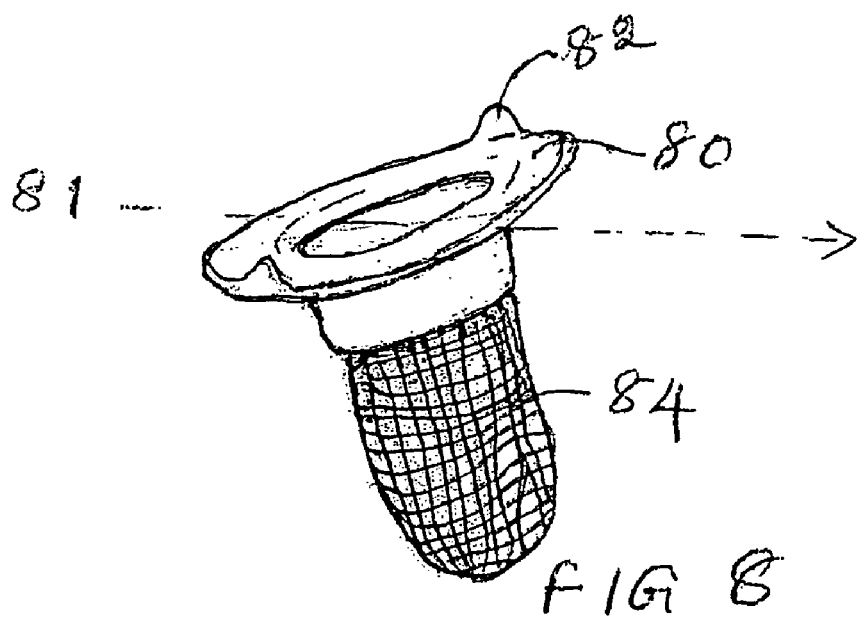
FIG. 8 illustrates a perspective view of an alternate embodiment of a net to be used in the stepped drain for collecting eggs.
Figure 17:
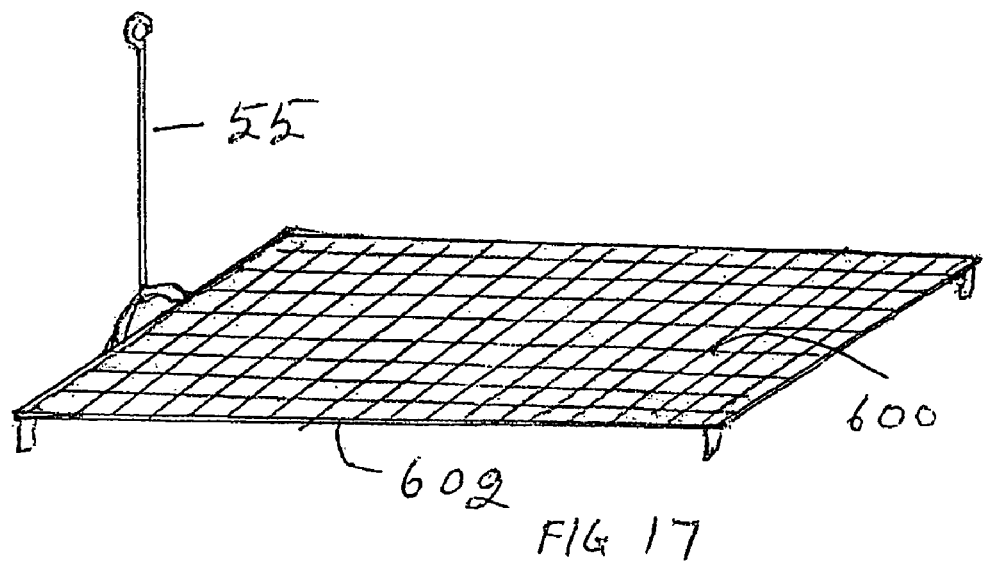
FIG. 17 illustrates a perspective view of an alternate embodiment of the fish barrier.
Figure 18:
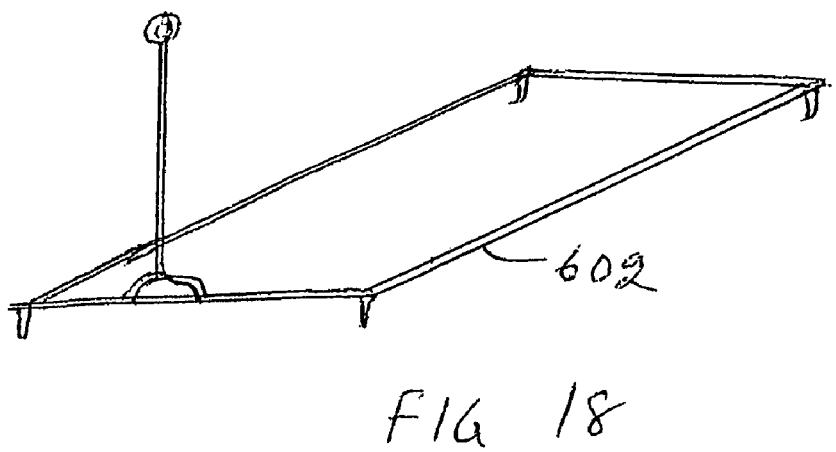
FIG. 18 illustrates a perspective view of the frame in which a mesh is placed to act as a fish barrier.
Figure 19:
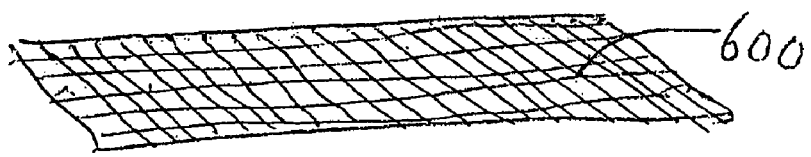
FIG. 19 illustrates a perspective view of a mesh that can be used for making the fish barrier of FIG. 17.

In the preferred embodiment of this invention, a fish barrier 54 (FIG. 1, FIG. 2, FIG. 5, FIG. 6, FIG. 7) having holes of a size (about 2-5 millimeters) that prevent the fish from crossing, but does not prevent eggs from falling through, is made of a suitable non-toxic material such as polycarbonates, glass, or other plastic .The holes can be about a millimeter apart from each other. If the material used is lighter than water, the barrier 54 is weighted down using metal feet or borders or by other suitable means and is placed at the bottom of the tanks 32. The dimensions are so made so as to allow the barrier 54 to fit into the tank bottom easily but without allowing more than a few millimeters of space (say 3 millimeter) around it to the walls of the tank 32. It must also accommodate the baffle 92 without difficulty but leaving as little space as possible. The barrier 54 has feet that elevate it about 3 cm above the bottom of the tank 32. Taller or slightly shorter feet can be used, but this height is preferred to optimize space, while serving the purpose of preventing scavenging of eggs or embryos under it by adult fish. Thus using the barrier provides a new use for the baffle, which now serves to draw the eggs to the spout rather than just facilitating self-cleaning of the tanks. In another embodiment of the fish barrier (FIG. 17, FIG. 18 and FIG. 19), a mesh 600 of a suitable material such as nylon, other plastics or stainless steel etc, with holes at longest dimension of about 2-5 mm width is appended onto a frame 602 of stainless steel or other suitable material. The size of the mesh holes in the barrier will depend on the size of fish raised. The height of the feet is also about 3 cm as for the preferred embodiment. Irrespective of the chosen embodiment of the barrier, a handle 55 (FIG. 5, FIG. 6, FIG. 7, FIG. 17, FIG. 18) is preferably attached to the barrier such that it fits into the tank 32 (when the barrier is in the floor of the tank)

without impeding closure of tank lid 90 and allows easy removal of the insert. The handle is preferably made of a stiff material so it stands leaning on or near the tank wall as shown in FIG. 5.

Figure 3:
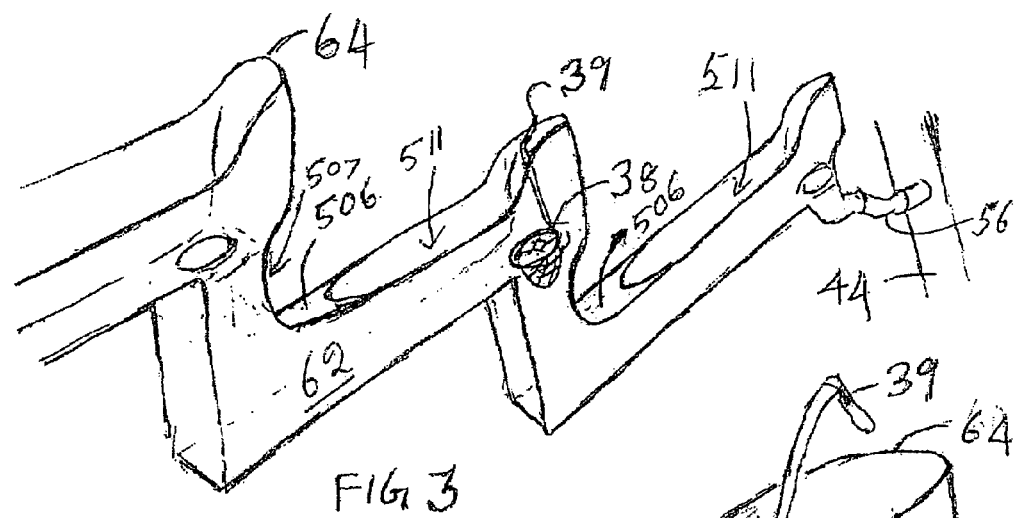
FIG. 3 illustrates a perspective view of one preferred embodiment of a stepped drain with a net inserted at a junction.
Figure 4:
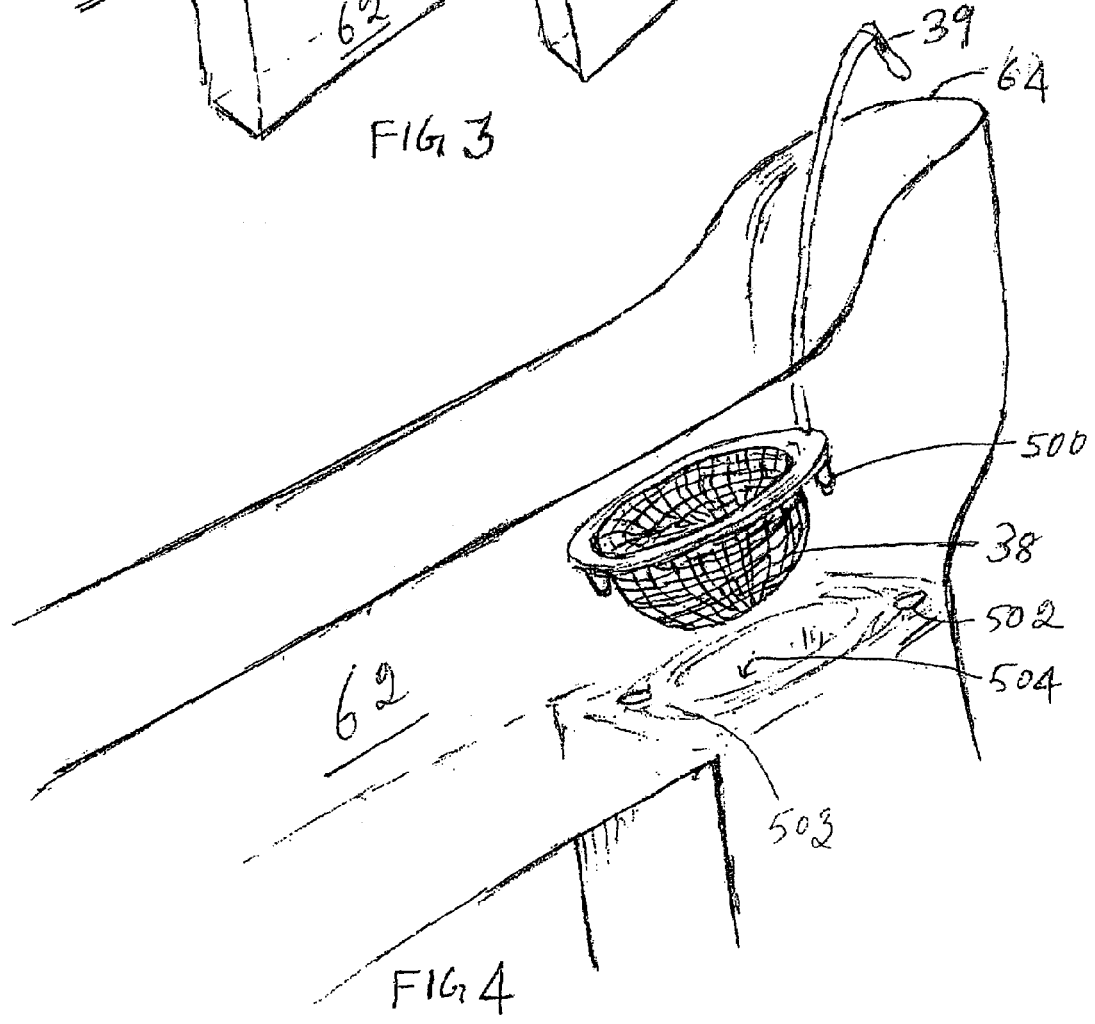
FIG. 4 illustrates an enlarged perspective view of the junction in the stepped drain of FIG. 3 having a net poised for insertion.

My egg collection research system employs a set of stepped drains generally designated 62 (FIG. 1). Stepped drains 62 (FIG. 1, FIG. 2, FIG. 3, FIG. 4) may be transparent or opaque and can be made injection molded as one unit or assembled from parts using materials such as polycarbonate, plastics, metal, or any material readily apparent to those skilled in the art. The vertical component (i.e., the junction between steps of the stepped drain 62, FIG. 1, FIG. 3, FIG. 4) has walls on all four sides continuing down from each step such that the face 507 is closed with a hollow portion for passage of water through opening 504 (FIG. 4). The horizontal component is partially closed at the top 506 (FIG. 3), which is continuous with the wall 507 from the vertical component of the stepped drain 62. The spout 58 of the tanks 32 empties into the open top 511 of the stepped drain 62 (FIG. 3). The horizontal component ends in a raised spill guard 64, after which, the drain steps lower to the next level using a similar arrangement as shown in FIG. 1 and FIG. 3. After a series of steps, the drain opens via a tubular conduit 63 into a connector 56, which communicates to the common vertical drain 44 (FIG. 1, FIG. 3). The connector 56 may be a short flexible tube made of rubber or plastic or any other suitable material. It may alternatively be a firm component of the common vertical drain 44 into which the tubular end 63 of the stepped drain 62 can removably fit into without water leak, in a manner such as known to those skilled in the art of plumbing.

Figure 15:
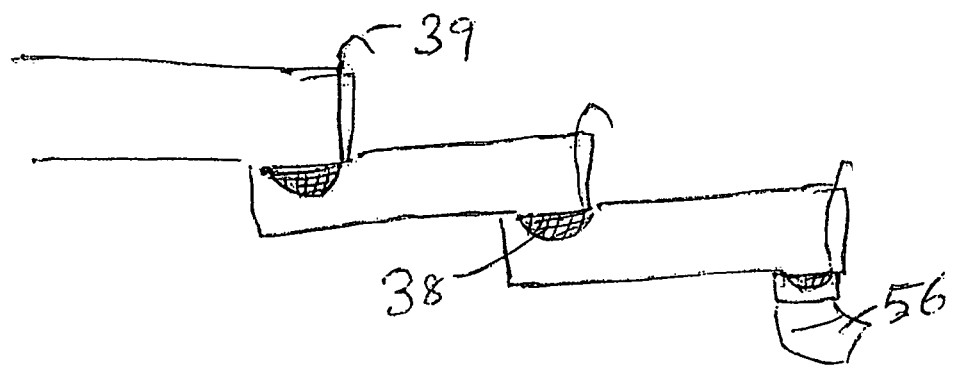
FIG. 15 illustrates a perspective view an alternate embodiment of the stepped drain.
Figure 16:
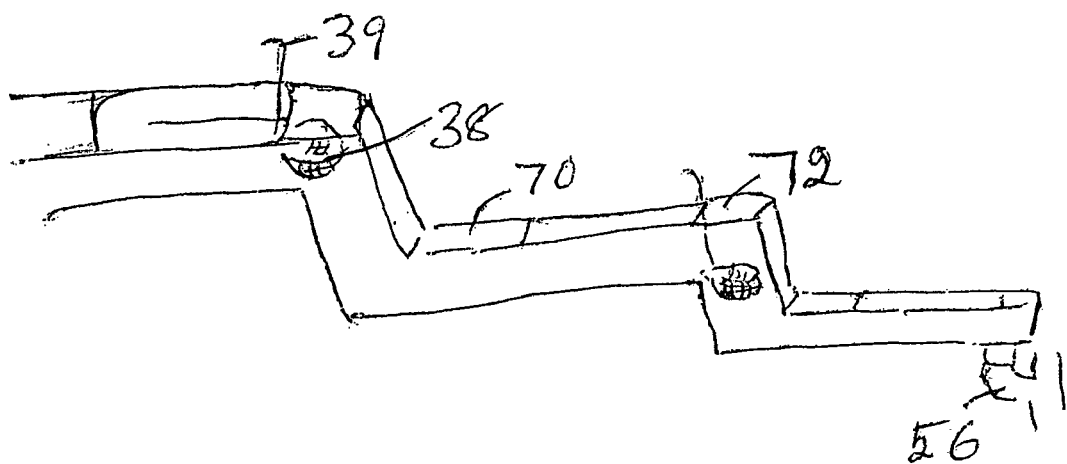
FIG. 16 illustrates a perspective view of yet another alternate embodiment of the stepped drain.

FIG. 15 shows an alternate embodiment of the stepped drain, which does not have the spill guard 64. FIG. 16 shows yet another embodiment of the stepped drain which has a covering 72 at the top to prevent water flowing down the vertical component of the drain from splashing. The stepped drain 62 has several junctions in it as it steps down (FIG. 1, FIG. 3). The drain opens into an adjacent lower step by means of opening 504 (FIG. 4). A removable net 38 with dimensions so as to be accommodated into the edge of opening 504 is made of stainless steel or nylon or other material with a rim, which can support it from falling into the hole 504. The net 38 has a handle 39 and two small studs 500 in its rim (FIG. 4). The two studs 500 align and sink into two holes 502 on a ledge 503 surrounding the opening 504 of the stepped rack 34 (FIG. 4) when placed on it. The holes 502 open into the vertical portion of the stepped drain 62 along with opening 504. Placing the net 38 with the studs 500 in the holes 502, causes the water to flow only though the net 38 and blocks the holes 502. This arrangement causes any eggs in the water to be trapped in net 38. The bottom and side walls of stepped drain 62 can have any of several cross sections such as curved or straight or any other shape which will carry water without spilling.

Figure 9:
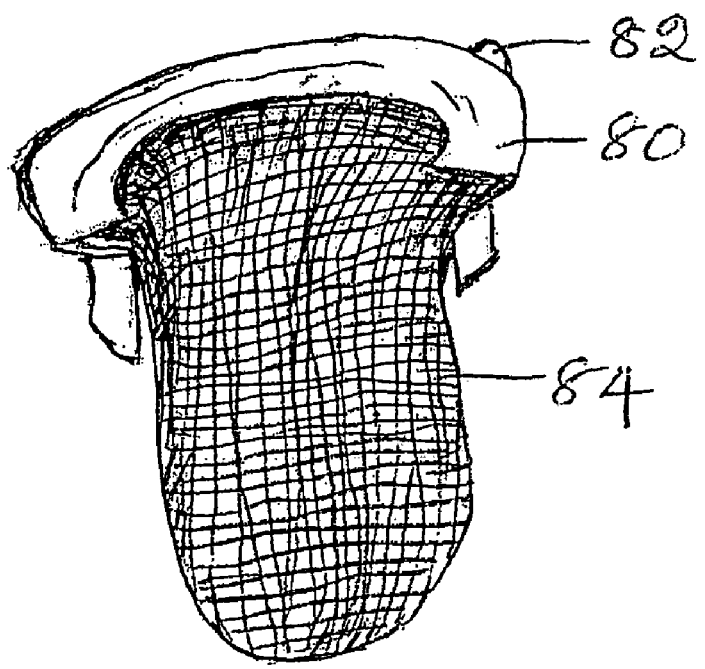
FIG. 9 illustrates a cross sectional view of the net illustrated in FIG. 8 taken through the line 81-81.
Figure 21:
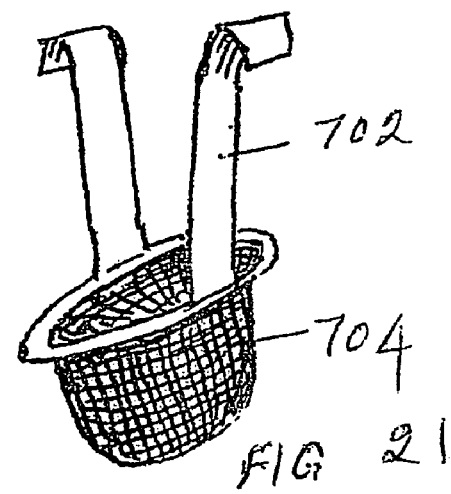
FIG. 21 illustrates a perspective view of another embodiment of the net to be used in the stepped drain or tank spout.

Alternative embodiments of the net are shown in FIG. 8, FIG. 9, FIG. 21, FIG. 22 and FIG. 23. In the alternate embodiment shown in FIG. 8, the net 84 has a rim 80 with small flaps 82 at sides by which the net can be lifted. FIG. 9 is a sectional perspective of the net 84 through line 81-81 in FIG. 8. In another alternative embodiment shown in FIG. 21 and FIG. 22, a net 704 has arms 702 made of a suitable material such as steel or plastic. The arms curl downwards as shown in FIG. 21 and are of a suitable height so as to suspend the net 704 from the walls of the stepped drains 62 or similar structures, exactly over an opening. For example, the net 704 can be suspended over the opening 504 (FIG. 4) by the arms 702 clinging to the walls of the stepped drain 62 or even from the spill guard 64.

Figure 22:
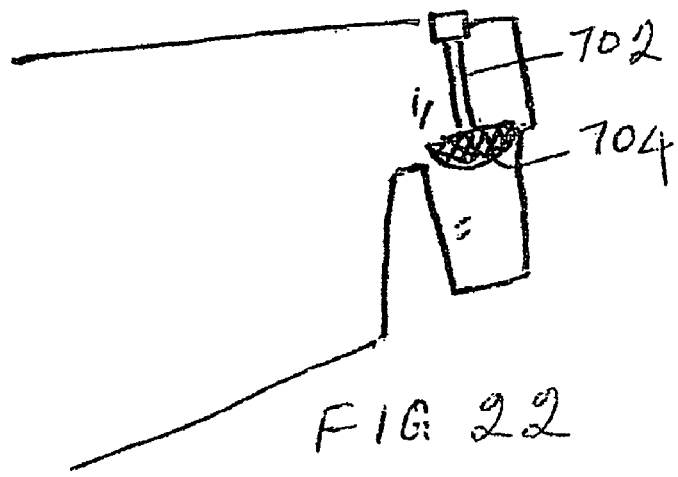
FIG. 22 illustrates a front elevational view of one embodiment of the net of FIG. 21 in use in a tank spout or stepped drain.
Figure 23:
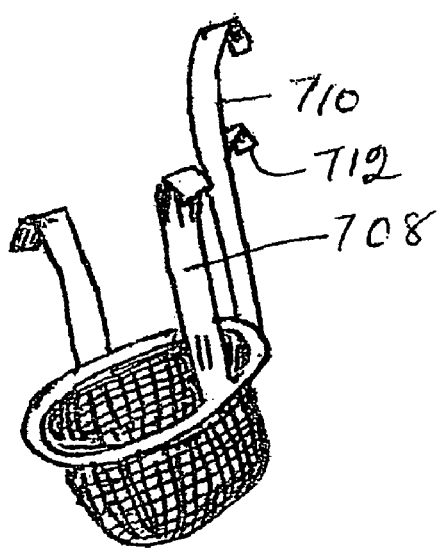
FIG. 23 illustrates a perspective view of yet another embodiment of a net for use in the stepped drain or tank spout.

The net can also be suspended at the entrance to the spout 58 in water tank 32 as shown in FIG. 22 after removing the lid. FIG. 23 shows yet another embodiment of a net in which three arms are used for support instead of the two arms 702 shown in FIG. 21 and FIG. 22. The arm 712 is of similar height or of different height as of arms 708. Additionally, a handle 710 (FIG. 23) is provided for easy removal or placement of the net. The number of arms and handles as well as shape and length can be modified to suit the stated purpose of trapping eggs at the locations described above or on other locations where a similar wall with an opening as described is seen.

Figure 13:
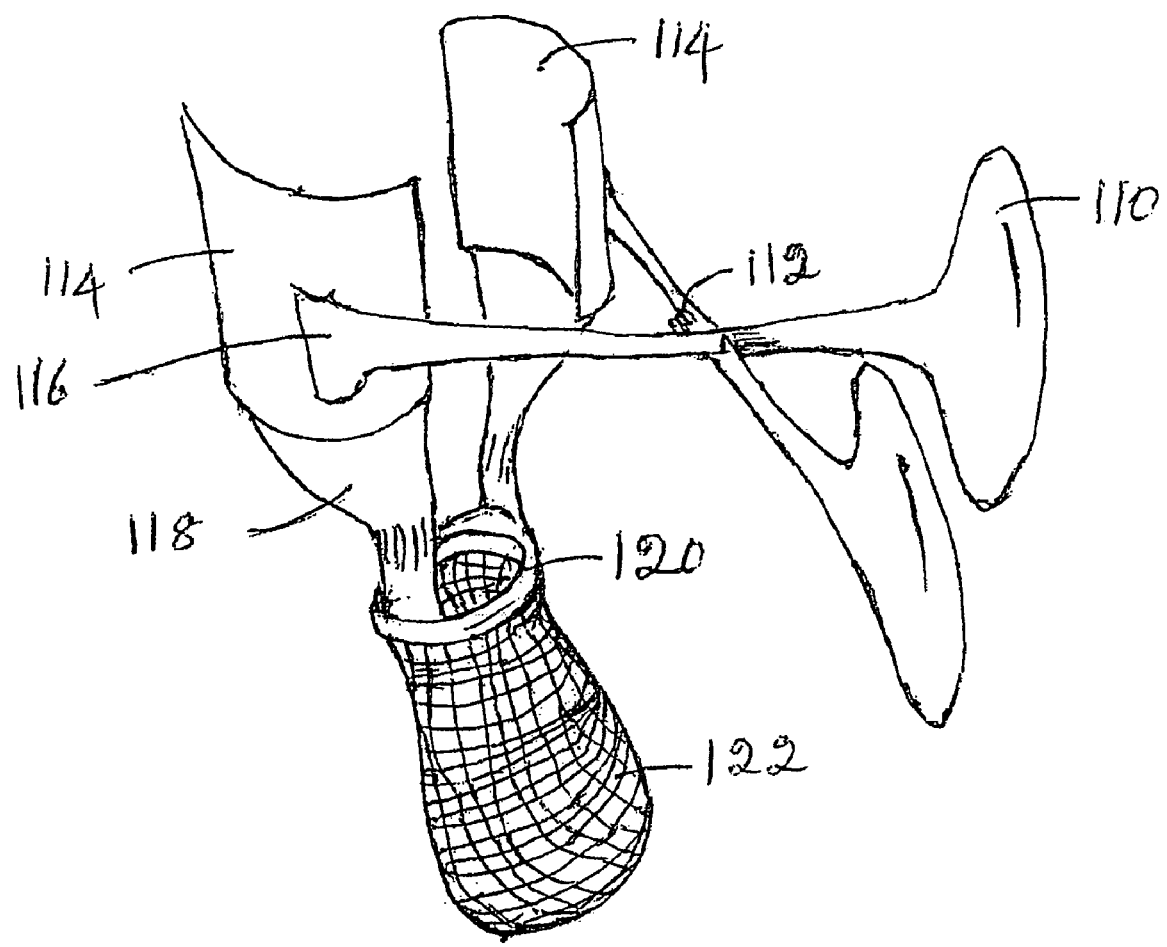
FIG. 13 illustrates a perspective view of another embodiment of a net, which is appended to a clip that can be attached to the spout of a tank.
Figure 14:
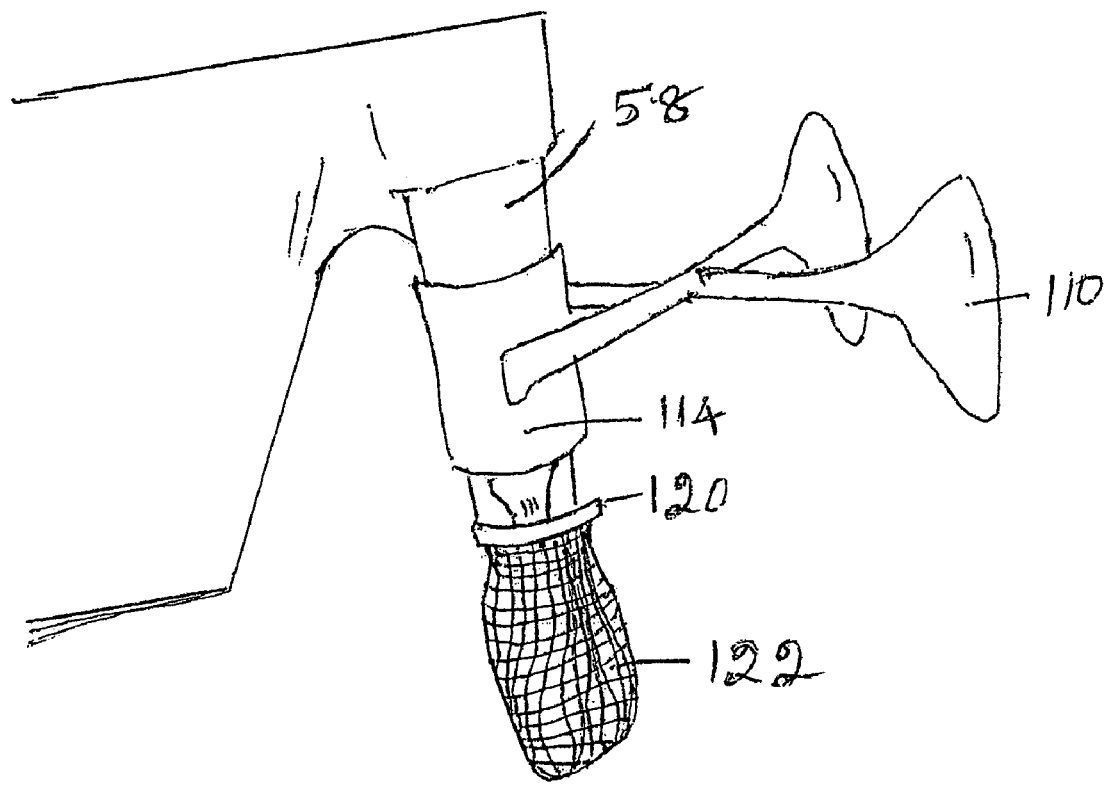
FIG. 14 illustrates a perspective view of the net of FIG. 13 in operation on a spout of a tank.

Another net that can be used for trapping eggs is a spout net 122 as shown in FIG. 13 and FIG. 14. FIG. 13 shows a perspective view of the spout net. Net 122 is attached to the claspers 114 of a spring clip which may be of plastic, metal etc. and may be of different patterns such as a claw or plainly as in preferred embodiment, by a thong 118 made of plastic or other non-toxic flexible material. Alternatively, if a stiff material is used in the place of a thong, the articulating points with the claspers as well as with the net are preferably hinged. The handles of the clip 110 can be shaped in a way as to be comfortable for gripping. Spring 112, keeps the claspers 114 opposed and close to each other. Other types of springs and mechanisms can also be used to achieve the function of a clip as is known to those skilled in the art of making clips. The claspers 114 are connected to the clip through the end 116 of the handle 110 of the spring clip. FIG. 14 shows a perspective of the spout net 122 in operation. When handles 110 are pressed close to each other, the claspers 114 move apart from each other. The claspers then can be made to grip or clasp the spout 58 of the tank 32. The net rim 120 can slide a short distance up the spout 58 so as to ensure all water exiting the spout 58, passes though the net 122. Any eggs or sediments smaller than the net mesh hole size gets trapped in the net, during water flow. The net 122 mesh hole size is about 2-5 mm. The size of all parts of the spout clip can be scaled to accommodate spouts of any size.

Figure 12:
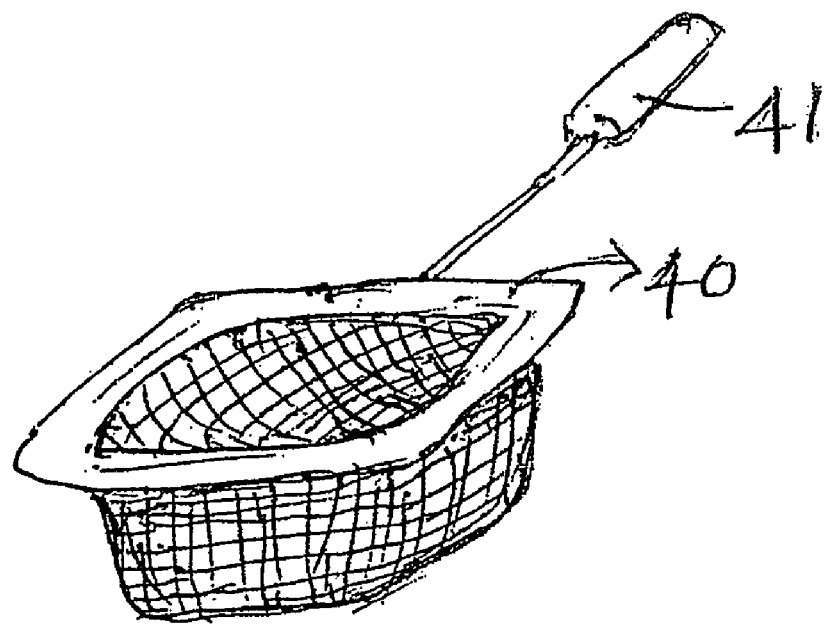
FIG. 12 illustrates a perspective view of one embodiment of a net to be used in the common vertical drain of FIG. 10.

Several nets including some described above, serve the purpose of trapping eggs at strategic points in the system. All nets such as nets 38 (FIG. 1, FIG. 3,FIG. 4), nets 40 (FIG. 1, FIG. 11, FIG. 12), net 84 (FIG. 8, FIG. 9) net 122 (FIG. 13, FIG. 14), net 42 (FIG. 1), nets 308 and net 704 (FIG. 21) that are meant for trapping eggs, have a mesh made of nylon, stainless steel or other suitable material having holes significantly less than the size of fish eggs. For instance, if zebrafish eggs have a diameter of 0.8 mm, the mesh hole length at its longest dimension can be significantly smaller, say about 0.2 mm or so. While a mesh having holes (in the longest dimension) of any size smaller than 0.8 mm (i.e., in this egg size example) can be used, less than average sized eggs may escape and hence a smaller hole size (in the longest dimension) such as 0.4 mm or less is preferred. The mesh holes in general, have to be large enough for water to flow through but small enough to trap the eggs.

The common vertical drain 44 is made of polycarbonates or plastics or any other suitable material. It is secured to the vertical rack 201 by ties or by brackets from the rack. It can alternatively be secured to the stepped rack 34 using similar means. The common vertical drain 44 has a funnel 60 inside its outer walls, which serves to bring any water flowing into the drain from above, away from the walls. The funnel 60 is placed in the common vertical drain 44 in the region between the inlets of any two consecutive (or as desired by the user) stepped drains 62. A net 40 with handle 41 can be inserted by means of a side opening 130 just underneath the funnel on ledges 61, which serve to hold the net 40(FIG. 10, FIG. 11). Thus the funnel 60 directs the water flowing down the common vertical drain 44 onto net 40, if the net is inserted. In an alternate embodiment, the common vertical drain can be constructed without funnel 60, ledges 61 or hole 130. The common vertical drain may have a cross section of any shape such as square, such as oval, circular, triangular etc, with the net 40 rim shaped in such a manner as to fit into opening 130. The common vertical drain may be manufactured by injection molding or assembled from components. The common vertical drain continues down to open into a water reservoir 43. The water-entering reservoir 43 passes through a removable net 42. In an alternate embodiment, the lower portion of common vertical drain 44 can be bent near the bottom to reduce the force of water flowing to the reservoir 43. The reservoir is of a height as to prevent the spilling of water outside of it when the water from the common vertical drain 44 flows into it. The water from the reservoir 43 flows to different modules for aeration/filtration such as particle filters, UV filters, biological filters, carbon filters, aerators, pump etc, before re-entering circulation through supply conduit 202.

Figure 20:
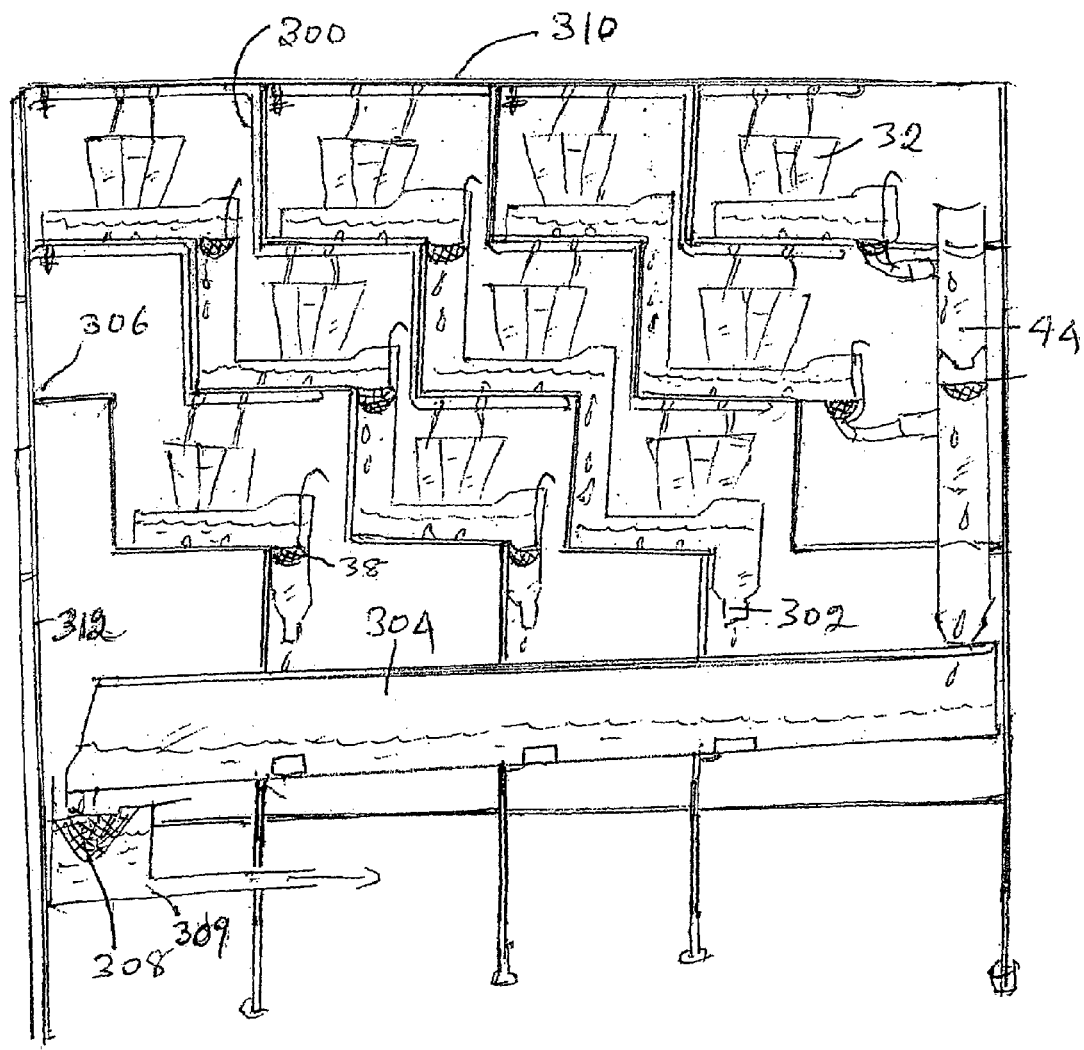
FIG. 20 illustrates a front elevational view of an alternate embodiment of an egg collection apparatus.

FIG. 20 has shows an embodiment within the scope of the invention and has been given for illustration. In this alternate embodiment of the invention (FIG. 20), the unit has been expanded vertically and horizontally to include more number of tanks 32. The steps in the racks have also been made taller. In this embodiment, some of the stepped rack 300 attach to a horizontal frame 310 whereas other stepped racks 306 attach to the vertical component of the rack 312. The water supply arises from either a vertical conduit attached to the vertical frame or from the horizontal conduit attached to the horizontal frame 310. The stepped drains either drain into a common vertical drain 44 or a common horizontal drain 304 before entering reservoir 309. The common vertical drain 44 also drains into the common horizontal drain 304. A net 308 is placed ahead of the water entering the reservoir 309 for trapping eggs.

The unit can thus be expanded vertically using similar rows or horizontally by extending the stepped racks.

The operation of the system described and illustrated in FIGS. 1-23 follows. Water going up conduit 202, flows into the water supply conduits 36A and 36 B and then through feed pipes 52, reach into the lid 90 of the tanks 32 where adult, egg laying fish are housed (FIG. 1). The water in tank 32 fills until it reaches sufficient height to overflow into the spout 58 and onto the stepped drain 62. The stepped drain 62 carries the water down a series of steps and into the conduit 63 and opens into the common vertical drain 44 via the connector 56. The water then flows down to reservoir 43 and to the modules of filters, aerators etc and then again is pumped up into conduit 202.

Either shortly after the 'dawn' or before that, a user wishing to collect eggs inserts the barriers 54 into tanks from which eggs are to be collected. The barrier 54 can be left indefinitely in the tank 32 bottom if daily egg collections from the tank are desired. The barrier 54 allows the eggs laid by the fish at 'dawn' to fall through to the bottom of the tank 32. The eggs and sediments at the bottom of the tank 32 are swept by water flow towards the baffle 92 and subsequently carried by the water into the stepped drain 62 via spout 58. The user places nets 38 to interrupt water flow at the junctions in-between steps in the stepped drain 62 as shown in FIG. 1, after or before 'dawn' or even by the previous night.

If the user desires eggs to be collected from tank 32 A, the user places net 38 A at, or before 'dawn' and after about one hour or so, can remove the nets 38A with eggs and sediments collected in them from tank 32 A. If the user wants to isolate eggs from tank 32 B, the user uses nets 38 A and 38 B as shown in FIG. 1. In such an arrangement, eggs from 32 A are prevented from crossing net 38 A and the eggs from tank 32 B alone are trapped inside 32 B.

Similarly for tanks in stepped rack 34 C, the user, by placing nets 38 E, 38 F, 38 G and 38 H in the junctions in stepped rack 62 B, can collect the eggs from tanks 32 E, 32 F, 32 G and 32 H respectively. Thus by strategically placing nets 38, eggs from any of the tanks 32 can be specifically collected.

Alternative embodiments of the net 38, net 704 (FIG. 21,FIG. 22, FIG. 23) or net 84 (FIG. 8, FIG. 9) can be placed in the opening 504 of stepped drain 62 to collect eggs. Net 704 can also be placed in the water inlet 59 (FIG. 14) to trap eggs with suitable modification of dimensions. Spout net 122 (FIG. 13, FIG. 14) can also be used to trap eggs from individual tanks 32.

If the user wishes to collect eggs from all the tanks 32 in the stepped rack 34B, the user can place a single net 38 D in the stepped drain 62 A. The eggs carried by water from all the tanks 32 has to flow through the net 38 D before draining into the common vertical drain 44. The eggs carried by the water from all the tanks placed in stepped rack 34B are thus effectively netted by 38 D.

Using a similar method, eggs from tanks placed on stepped rack 34 C can be collected. If the tanks 32 are small, more than one tank can be placed in each step of the stepped rack 34 with suitable water feed. In this case, net 38 placed in the junction of the stepped rack into which water flows from these tanks will collect eggs from all tanks in the step.

The purpose of the net 40 (FIG. 1, FIG. 11) is to collect eggs from all tanks 32 in levels above it when nets 38 are not placed at any junction or only in a few junctions in the stepped drains 62 above it. In a vertical expansion of the unit, many rows (more than two) of substantially identical stepped racks 34 are envisioned that support stepped drains 62 and tanks 32. In such an arrangement, all nets 38 can be removed from levels above the funnel 60 and net 40 can be inserted to collect eggs from water from tanks in all levels above it. Alternatively, a stepped drain 62 can be prevented from emptying its eggs into net 40 by strategically placing a net 38 at the final junction in stepped drain 62 from where the water will flow into the common vertical drain. In this manner, eggs from selected stepped drains 62 can be collected.

Figure 24:
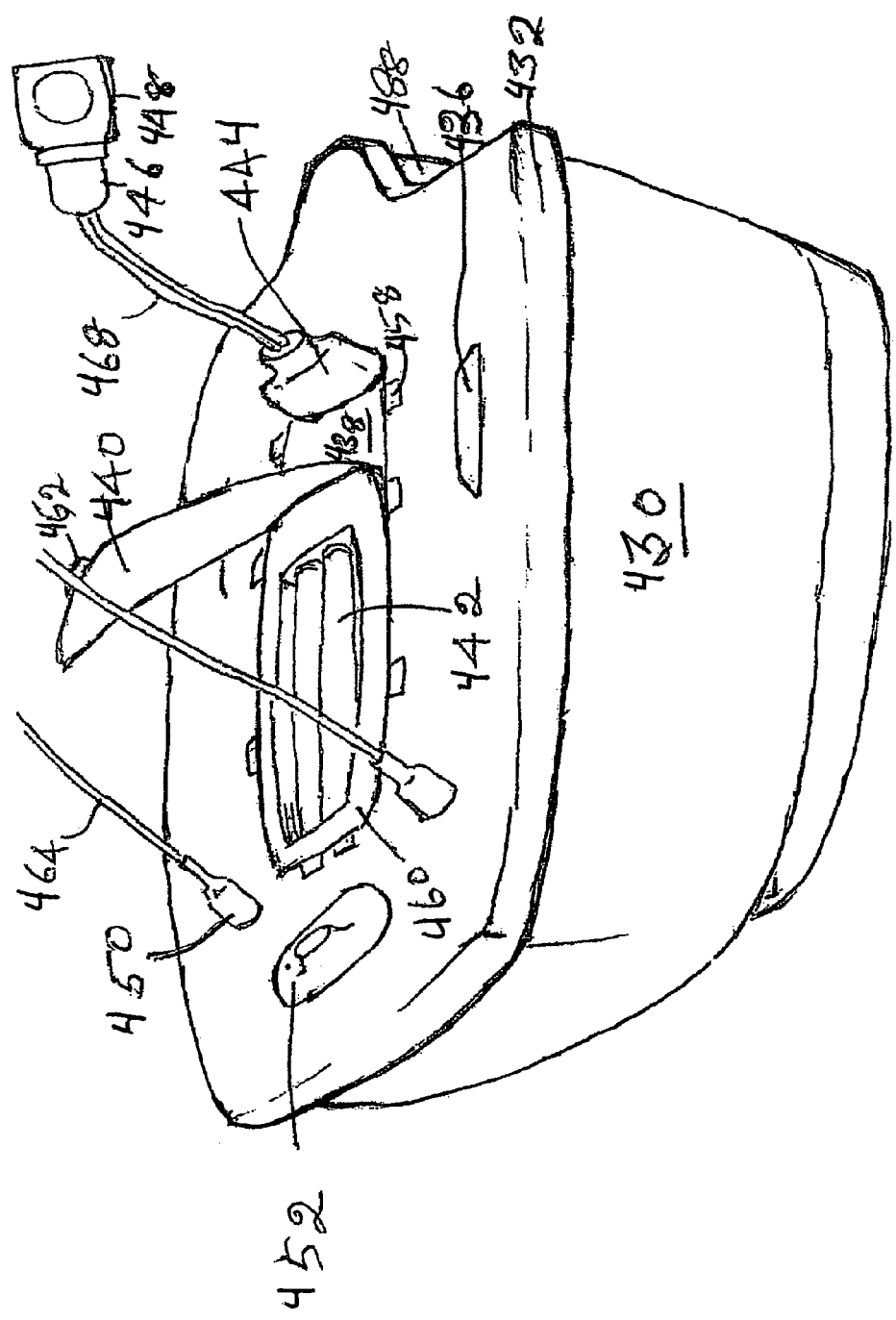
FIG. 24 illustrates a perspective view of a tank for use in the egg collection apparatus of FIG. 1 according to one embodiment.
Figure 25:
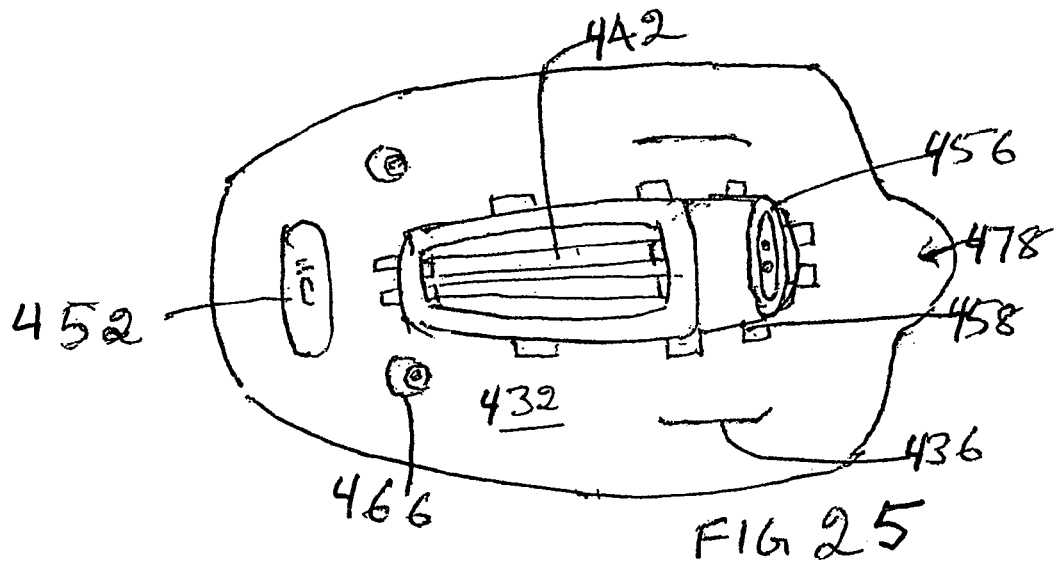
FIG. 25 illustrates a top plan view of the lid of the tank of FIG. 24 without the lid for the lighting unit.

Referring now to FIG. 24, the construction of some tanks is described. While these tanks are commonly used with the system described in FIGS. 1-23, the system is not intended to be limited to the following the aquatic housings or tanks. In fact, the transparent tanks already described or others can be used with the system in FIGS. 1-23.

Figure 26:
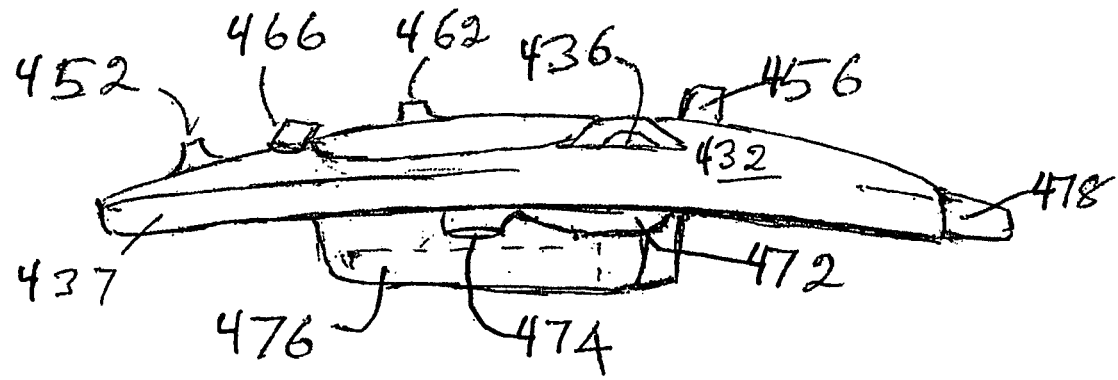
FIG. 26 illustrates a side elevational view of the lid of the tank of FIG. 24.

FIG. 24 shows a perspective view of the preferred embodiment of my completely opaque, internally lighted aquatic housing 430. The aquatic housing or tank 430 is a completely opaque-walled tank constructed of a plastic, polycarbonate or any other opaque material such as a metal, that is non toxic to the fish and can stably contain water housing the fish. In an alternate embodiment, the tank as well as the lids, have an insulating material in them such that the temperature loss or gain into and from the tank is minimized. The tank 430 has an opaque spout 488 for draining water away from it. The tank 430 is covered by a lid 432 (FIG. 25, FIG. 26, FIG. 27, FIG. 28) which has a hole 471 preferentially towards the center, in which is accommodated a lighting unit 438. The lighting unit 438 has a rim 460 that fits into a depression 470 on the hole 471 in lid 432 thereby suspending the lighting unit 438. Flanges 458 are provided as additional supports (which will fit into suitable depressions on a lid 432 for the tank) or the unit can be suspended by similar means on the lid. The lid 432 for the tank is designed so that when placed on tank 430, the tank is completely covered and there is no light entry into the tank at the points of contact with tank. Air may or may not enter through the points of contact. In the preferred embodiment, the lid has a flare 437, which partly covers the walls at the top portion of the tank 430 when in place (FIG. 26, FIG. 28) but other embodiments are possible with the object of providing a opaque cover for the tank. The lid juts out at a region 478 to accommodate the spout of the tank (FIG. 26).

Figure 27:
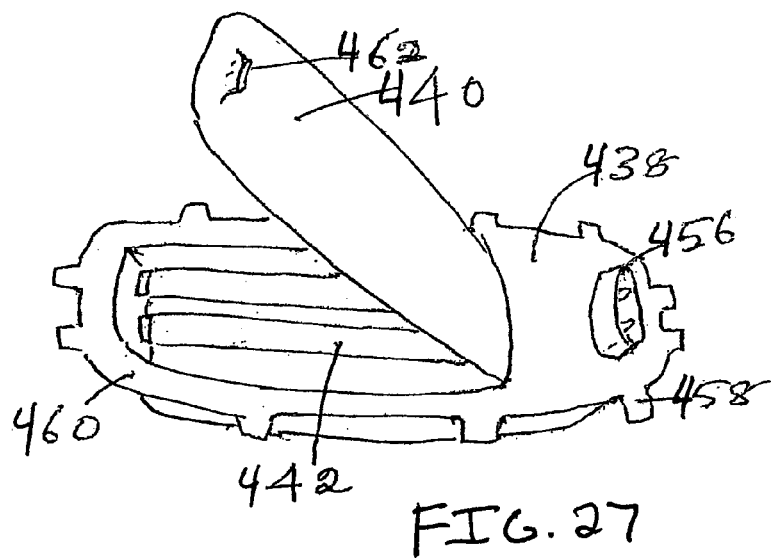
FIG. 27 illustrates a perspective view of the lighting unit for use with the lid illustrated in FIG. 25.
Figure 28:
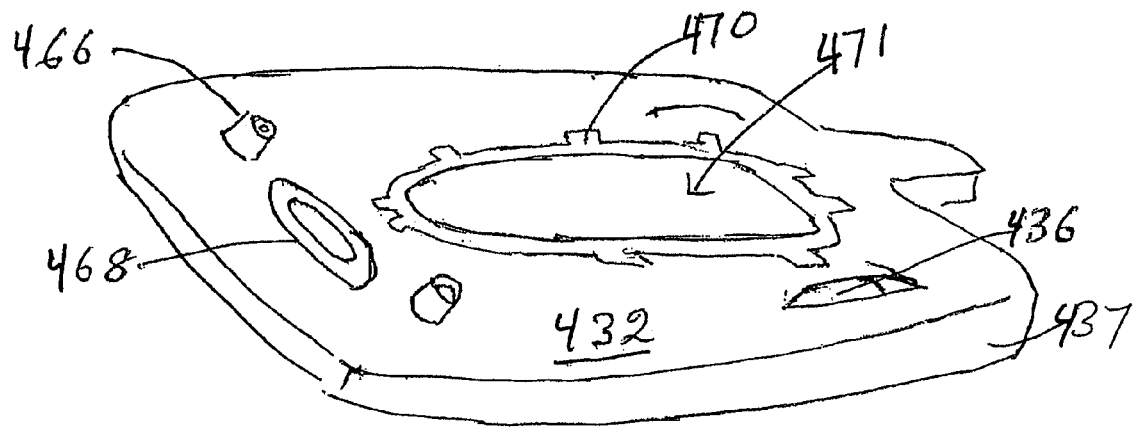
FIG. 28 illustrates a perspective view of the lid of the tank of FIG. 24 without the lighting unit illustrated in FIG. 27.

A light source 442 is placed in the lighting unit 438 and covered by a removable lid 440. The lid 440 preferentially has a reflective surface on the inside towards the light bulbs and is opaque on the side facing away (FIG. 27). The light source 442 can be fluorescent bulbs, light emitting diodes (LEDs), or other types of aquarium bulbs of suitable brightness so as to suit tank size and for purpose of giving the fish an artificial 'day' (i.e., light period) without straining them. The light source 442 can be singular or plural. The lighting unit lid 440 has a small handle 462 for removing it. The lid 440 may be hinged on one side to the lighting unit 438 or be free. The bottom of the lighting unit 438 at the portion covering the light source 442 is a transparent casing 476 (FIG. 26) made of a suitable plastic or glass, which provides a diffuse or clear lighting. The rim 460 as well as the flanges 458, and the body of the lighting unit 438 including all surfaces at the top of the unit are completely opaque. The whole lighting unit 438 can be removed from the lid 432 (FIG. 27, FIG. 28). The unit has a plug 456 (FIG. 26, FIG. 39) for providing electricity to the light source 442. In an alternate embodiment, the lighting unit can be a part of the lid.

The power source plug 444 is connected to either a digital or analog electronic timer unit 448 by plug 446.The electronic timer 448 can control either the gradual or abrupt beginning of the light or dark period. For instance, the 'dawn' can be set to be a gradual intensification of the light to capacity in a period of time, say 5 minutes or the lights can come on abruptly. Similarly, at the end of the light period, the light source 442 can dim, say in 5 minutes to darkness or may switch off abruptly. In an alternate embodiment, the electronic timer 448 can be built into the lid of the tanks.

Figure 29:
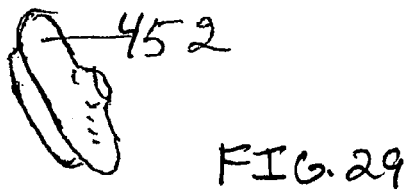
FIG. 29 illustrates a perspective view of the lid of the feeding hole defined in the lid illustrated in FIG. 25.

The tank lid 432 has a small food hole 468 closed by removable lid 452, which is opaque (FIG. 27, FIG. 29). This food hole 468 is used to feed the fish. When the lid 452 closes the food hole 468, no light can enter through the hole 468. Alternatively, more than one such food hole and of various shapes with suitable opaque lids to cover them can also be made on the lid 432.

An air vent 436 is connected to a bent air duct 472 that opens into the other side of the lid through opening 474 (FIG. 26). The bent air duct 472 prevents line of sight at both openings thus allowing movement of air but not passage of light across the lid 432. Alternatively, other similar arrangements can be made with the purpose of allowing air movement, but preventing light passage across the lid 432. In yet another embodiment, the air vents are placed on the top portion of the walls of the tank above the level of water. The air vent 436 helps to aerate the tank as well as to dissipate heat from the lighting unit 438. The inside of the air duct 472 is preferentially a light absorbing surface, such as that which is of a dark color, or a texture which prevents reflection of light and facilitates absorption of light. More or less number of air passages of various shapes, which do not transmit light, can also be constructed depending on the end user needs. Also the lid 440 of the lighting unit 438 can be provided with suitably scaled down air ducts such as 472 with open ends for cooling the lighting unit 438. To one of the openings, a cooling fan such as those used in computers can preferably be appended for cooling the lighting unit 438 and light source 442 without allowing light entry. In this case, the fan can be connected to and turned on along with the light source 442 or intermittently to cool down the light source.

Water inlets 466 are provided in the lid 432 into which opaque water feed tubes 464 can be fitted (FIG. 28, FIG 30, FIG 32, FIG. 33, FIG. 34). The water feed tubes 464 (FIG. 24, FIG. 32) have a preferably removable, opaque cuff 450 (FIG. 31, FIG. 34) made of rubber or of a similar suitable material. The cuff 450 serves to cover the water inlet 466 (FIG. 33), thus acting as a light barrier. In an alternate embodiment, an air bubbler, which is opaque, can also be introduced into the tank using a similar arrangement as for water inlet 466. Also a heating or cooling element or any monitoring system such as a camera, can be introduced into the tank, while taking care to prevent light entry into the aquatic housing from outside.

FIG. 35 shows a perspective of plug 444 having an opaque shield 445 made of rubber or other suitable material. The shield prevents water from entering the plugs 444 and 456 (FIG. 36) when they are connected. The shield may be made as component of either plugs 455 or 456 or as a removable unit.

Figure 37:
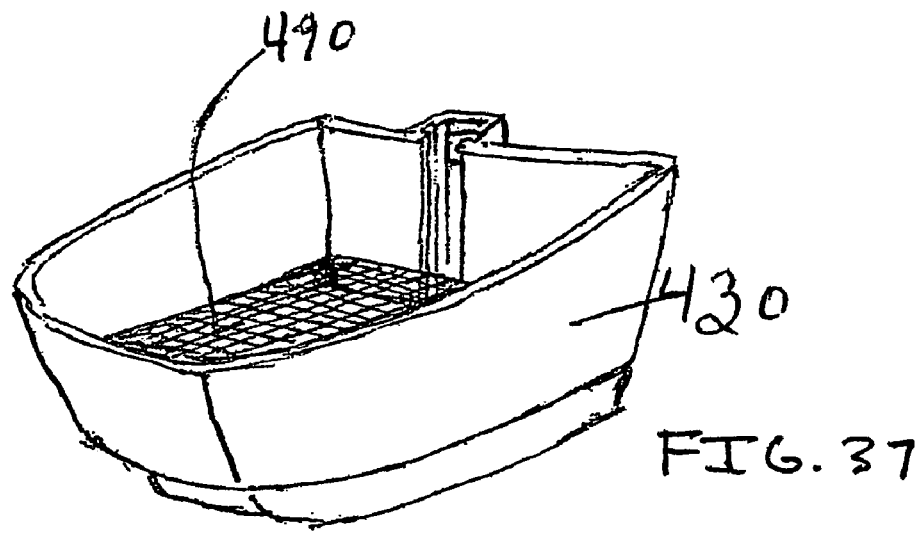
FIG. 37 illustrates a perspective view of the tank of FIG. 24 with fish barrier at the bottom.
Figure 38:
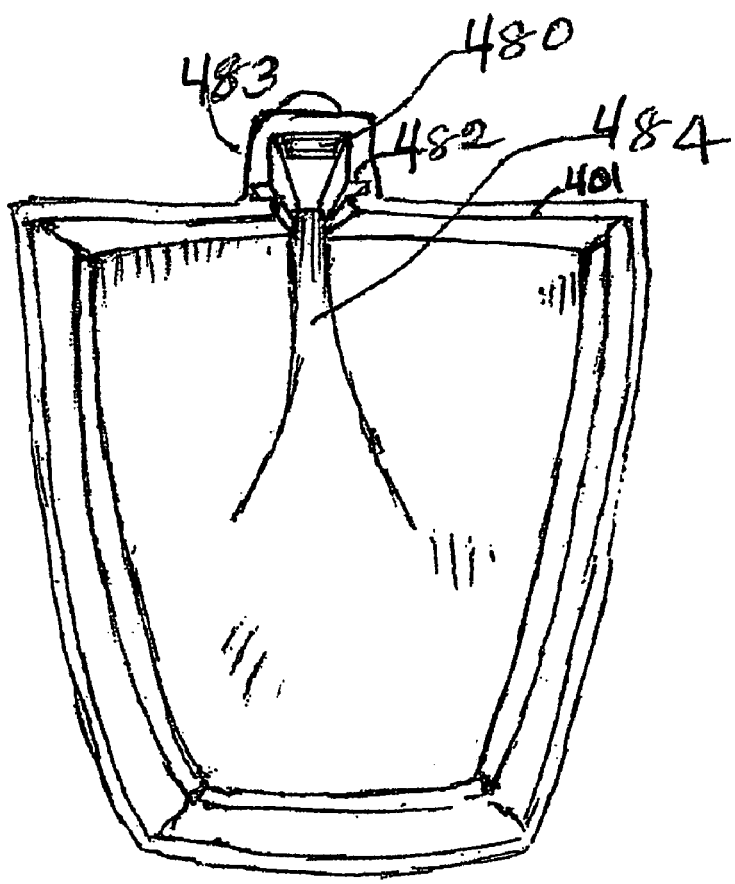
FIG. 38 illustrates a top plan view from the top of the tank of FIG. 24 showing a drain at the bottom as well as the spout assembly showing baffle grooves.
Figure 39:
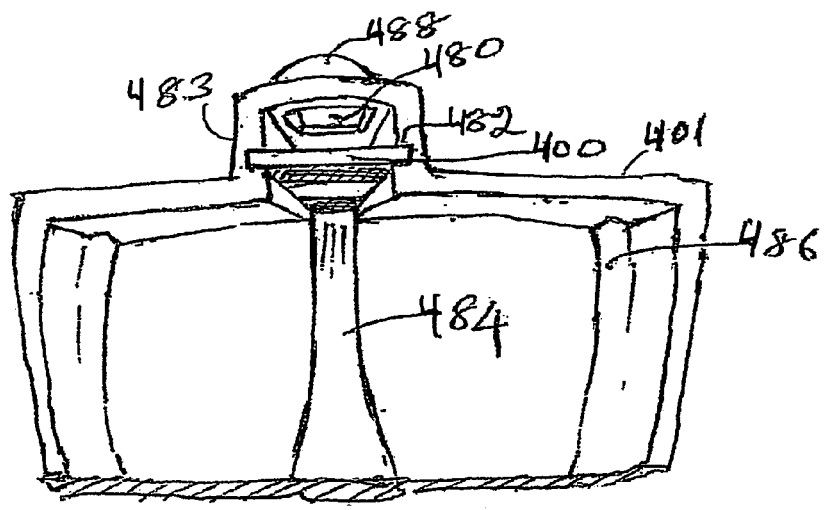
FIG. 39 illustrates an enlarged sectional view taken through line 39-39 of FIG. 40 illustrating a baffle inserted into the baffle grooves in the tank of FIG. 24.
Figure 40:
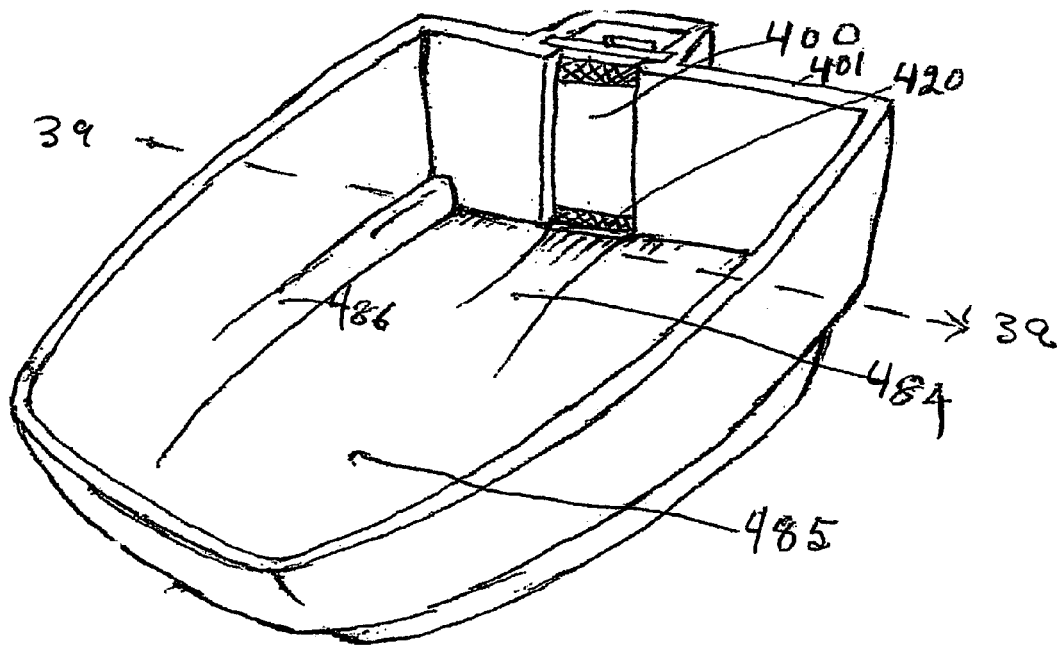
FIG. 40 illustrates a perspective view of the tank of FIG. 24 without the lid of FIG. 25 illustrating the baffle in the baffle grooves and drain.
Figure 41:
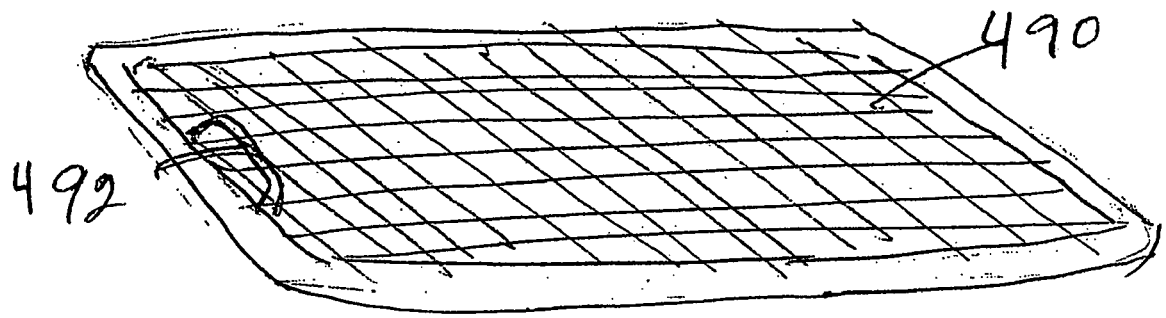
FIG. 41 illustrates a perspective view of a fish barrier.
Figure 42:
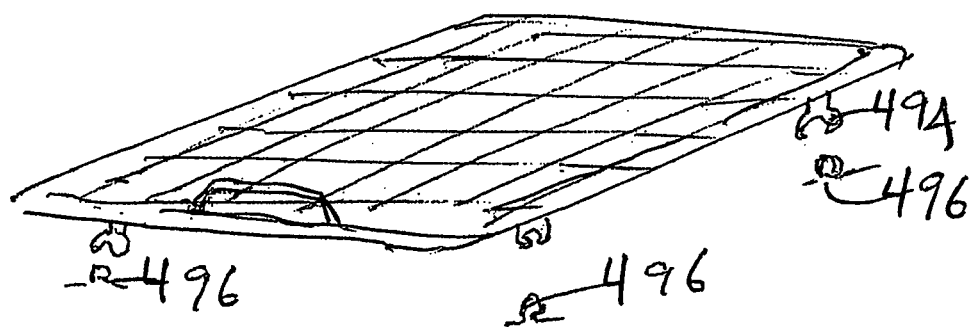
FIG. 42 illustrates a perspective view of the barrier having anchoring clasps.
Figure 43:
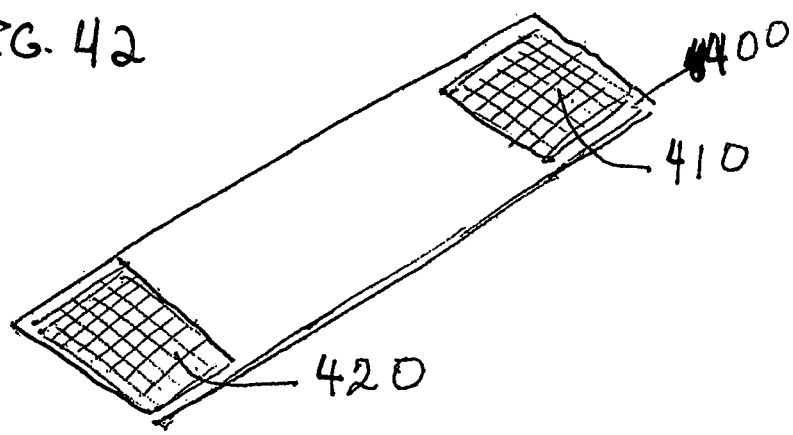
FIG. 43 illustrates a perspective view of a baffle.
Figure 45:
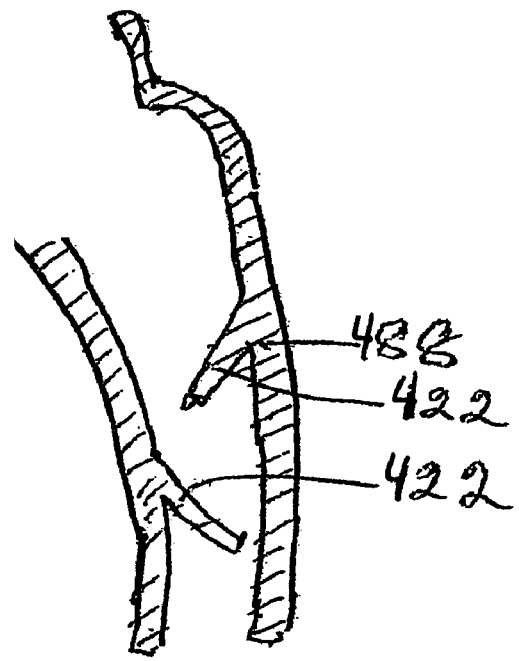
FIG. 45 illustrates a cross sectional view of the spout including light blocking vanes.

FIG. 37 shows the tank 430 with a fish barrier 490. The removable fish barrier 490 is constructed of a mesh of plastic or nylon or other suitable non-toxic material appended to a preferably stainless steel frame (FIG. 41, FIG. 42). The hole size in the mesh in the longest dimension is about 1-5 mm. The fish barrier 490 is placed on a ledge 486 in the tank, which is about 3 cm from the floor of the tank (FIG. 39, FIG. 40). The barrier dimensions is of a size that will fit into the tank smoothly with approximately less than 3 mm of space between the barrier and walls or baffle. The ledge 486 can be continuous or discontinuous. Other types of removable barriers can also be designed with similar hole size to fit in the ledge 486. For example, FIG. 42 shows fish barrier 490 with clasps 494 on the frame. The clasps can be appended to buttons 496 on the ledge 486 (not shown). The barrier 490 preferentially has a handle 492 for lifting (FIG. 41). The barrier 490 allows free movement of water, eggs and other materials to the tank bottom, but prevents the fish from going through. The floor of the tank 485 slopes into a drain 484 (FIG. 38, FIG. 39, FIG. 40) and wall 401. The drain 484 also slopes towards the wall 401 of the tank. The wall 401 has a small recessed area 483 jutting from it (FIG. 38, FIG. 39). The recess has two grooves 482 and has an opening 480 on the wall near the top. The two grooves 482 are baffle grooves into which baffle 400 (FIG. 39, FIG. 40, FIG. 43) can slide in. FIG. 39 is an enlarged perspective of FIG. 40 through line 39-39. The opening 480 near the top of the recess 483 is continuous with the spout 488 that leads to the outside. The spout 488 has on its inside, vanes 422 that point downwards as shown in FIG. 45. The vanes 422 alternate on different sides of the spout such that water with eggs and sediments can easily flow down the spout, but no light can enter into the tank by traveling up through the spout 488. Thus the crisscrossing of the vanes 422 prevent line of sight from the bottom of the spout 488 to the top. Alternatively, the spout can have a screw type canal in the middle, which will also completely cut off light. Such screw type holes in alternative embodiments, can also be used to provide air through the lid without letting light. The drain 484 is made in the floor 485 of the tank with the bottom of the tank being of variable thickness to bring about a slope. A suitable structure can be provided at the outside bottom of tank 430 either as part of the tank or as a separate unit, which will allow the secure and convenient placement of the tanks on a rack while maintaining the proper slope of the tank floor towards wall 401.

In an alternate embodiment, the tank has a flat floor, but a removable insert (say 1 cm high at the highest elevation) is provided which has a drain and/or slope and fits into the bottom of the tank underneath the barrier 490 with the slope towards wall 401.

Figure 44:
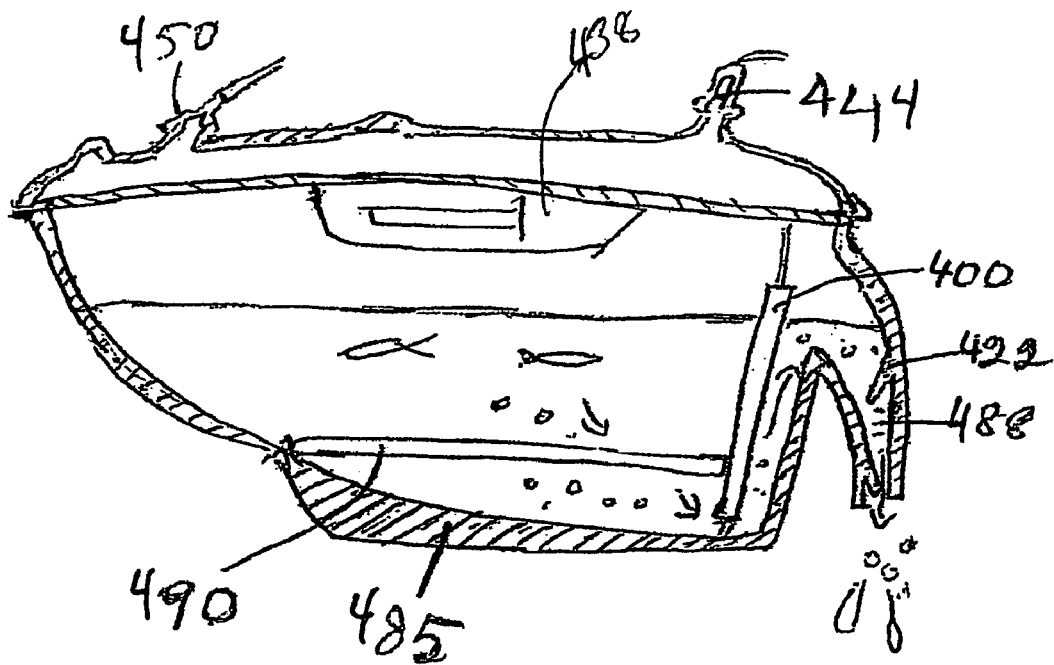
FIG. 44 illustrates a cross sectional view of the tank of FIG. 24 in operation.

The baffle 400 is made of plastic or polycarbonate or of other suitable material. The baffle 400 has two meshes 410 and 420 made of plastics, nylon or other suitable material and serves to prevent fish from passing through. Alternatively, instead of a mesh, bars or other structures with suitable spacing to prevent the fish from crossing, can be made. The mesh hole size for 410 and 420 at the longest dimension is about 1-5 mm if zebrafish are raised. The mesh hole size as wall dimensions of the tank and lid are scalable to accommodate the size of fish species housed and user needs. The bottom mesh 420 (FIG. 40, FIG. 43) has a height equal or approximately equal to the depth of the drain 484. Water in tank 430 fills up to the opening 480 of the spout beyond which it drains into the spout 488 (FIG. 44). The top mesh 410 (FIG. 44) is positioned in the baffle such that, when the baffle is inserted and the water in the tank 430 is at the level of the opening 480, the mesh is still above (say 1 or more cm) the water level (FIG. 44). When water is flowing into the tank and draining from the spout 488, the baffle 400 prevents flow of water from the top of the tank into the opening 480. The baffle facilitates the movement of water from the bottom of the tank through mesh 420 and into the spout 488. Since the bottom mesh 420 is placed opposed to the drain 484, sediments smaller than mesh hole size along with water from the drain 484, get sucked into mesh 420 and up to the opening 480 and into the spout 488.

The operation of the completely opaque, internally lighted aquatic housing is described here in below. FIG. 44 illustrates a cross section of my completely opaque, internally lighted aquatic housing unit in operation. When the internal light source 442 is off, no light enters the unit. Thus the fishes are kept in total to near total darkness. At 'dawn' the fish breed and lay many eggs. The eggs fall through the barrier 490 and into the floor 485 of the tank and roll into the drain 484. Due to the draining of water from spout 488, a current is set up inside the tank with water from the bottom of the tank being sucked into mesh 420. From the movement of water into the mesh 420 of the baffle 400, as well as due to the slope of the tank floor 485 and drain 484 towards that point, the eggs move close to the mesh 420 and are sucked up to opening 480 and into the spout 488. If a net with a mesh hole size at the longest dimension smaller than the diameter of the fish eggs is placed on the spout, the eggs will become trapped and can be easily collected. A researcher/user can customize the light dark cycle and the 'dawn' using the electronic timer 448. While egg collection is a primary object of the invention, my invention can be used for raising aquatic life in different light cycles.

Many such tanks can be paced on racks and the lighting in each can be individually controlled using a multi-user programmable electronic timer with a digital interface (not shown). The spout may not be provided if units do not have running water flow.

Figure 46:
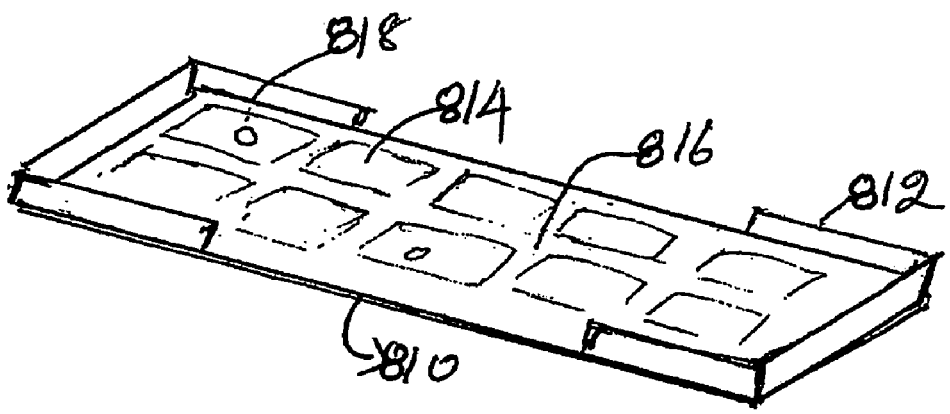
FIG. 46 illustrates a perspective view of a slide according to one embodiment.

Analyzing the eggs that are collected requires using microscopic instruments and devices. The following devices are a few embodiments that are custom made for analysis of the collected eggs. In one embodiment, a slide 10 (FIG. 46) preferably made of glass or similar highly transparent, solid, non-toxic material is taken as is commonly available for microscopy. Alternatively, for fluorescence microscopy, the slides can be opaque. Small end walls 812 of about a few micrometers to a few millimeters height and of a about a few micrometers to millimeters width made of a suitable non toxic material such as plastic or glass is adhered to the slide 810. Non-toxic glue is used for the purpose or the end walls 812 is similarly adhered to slide 810 by a process known to those skilled in the art of manufacture of slides. The slide has ridges 816 made of preferably a hydrophobic, non-toxic material or coated with such a material as Teflon. The ridges 816 divide the slide into 810 different equal wells 814 as shown in FIG. 46. The bottom of well 814 is slide 810 and is transparent and clear. The wells 814 may be square, rectangular, circular or of any other shape and the number and size of such wells on a slide can vary. The ridges 816 have a height of about 0.10-0.40 mm (for observing zebrafish embryos). A cover slide 820 (FIG. 47) is provided whose dimension allows it to be fit closely within the end walls 812 on slide 810.

Figure 47:
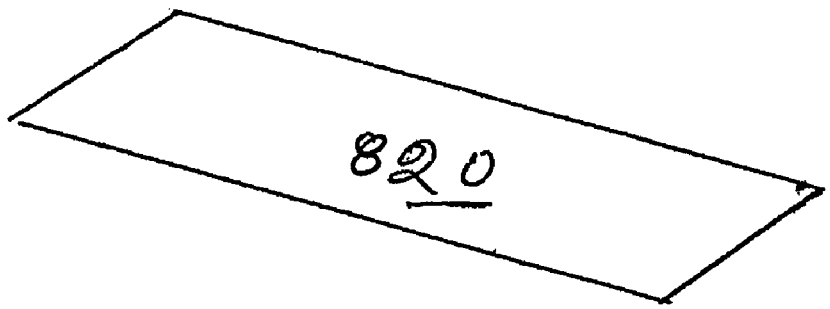
FIG. 47 illustrates a perspective view of a cover slide for use the slide illustrated in FIG. 46.

The operation of the slides described in FIGS. 46 and 47 for research of a zebrafish embryo or some other specimen follows. The zebrafish embryo or other speciment 818 is placed in the wells 814 with some water or other suitable liquid (FIG. 46) in which the specimen can be held. About 50 microliters of water or suitable liquid is placed in well 814 to prevent the specimen from drying up and/or to keep it alive. When the cover slide 820 is placed inside the end walls 812 of slide 810, the ridges 816 prevent the embryo or specimen in wells 814 from being crushed. The specimen in the slide 810 with a clear cover slide 820 placed on it, can then be observed under a microscope.

Figure 48:
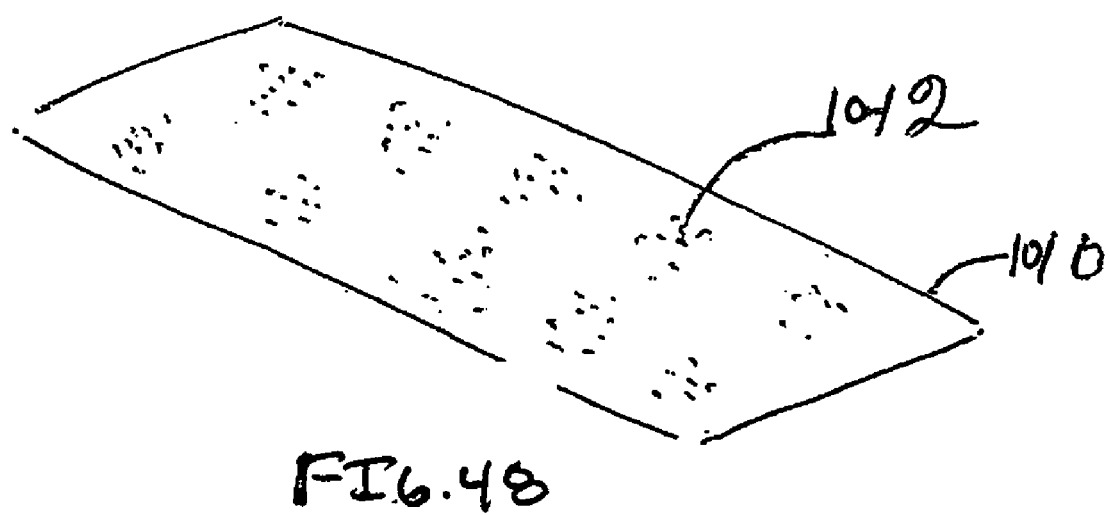
FIG. 48 illustrates a perspective view of a fluorescent slide with a fluorescence coating applied in the form of fine dots.
Figure 49:
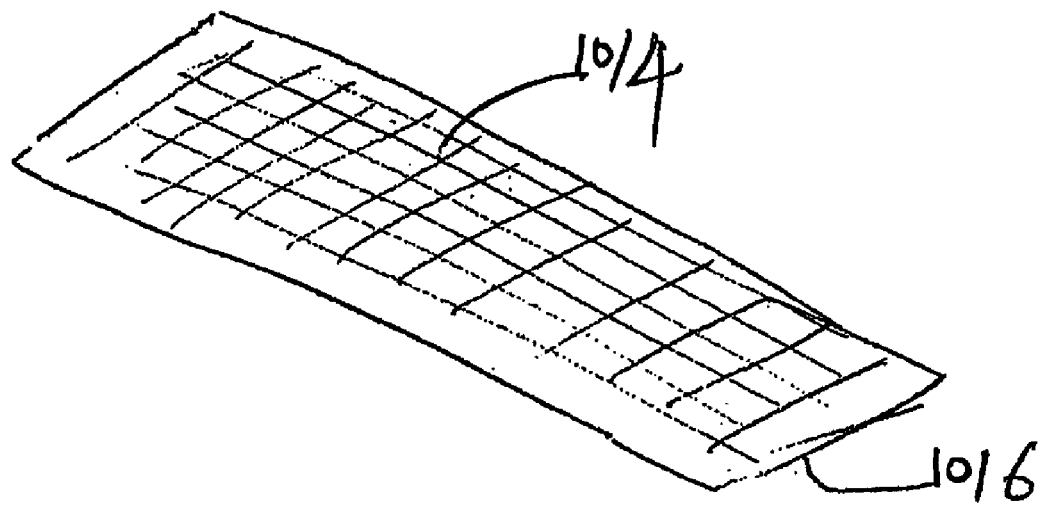
FIG. 49 illustrates a perspective view of an alternate embodiment in which a fluorescence coating is applied as a grid.

In another embodiment, another slide, which is opaque or transparent and preferably made of glass, is taken. The slide is coated with a stable, non-toxic fluorescent material such as is known to those skilled in the art of making paints and slides. The coating is made in the form of different patterns of spots or lines or even as uniform shading or as to fade in different regions. Alternatively, the whole slide or parts of the slide can be made of a suitable, fluorescing glass. The dimensions of the spot or lines are arranged so as to be closer or father to each other thus forming patterns as shown in FIG. 48 and FIG. 49. In FIG. 48, a fluorescence pattern 1012 is laid using dots such as from a fine spray whereas in FIG. 49, the slide 1016 has a fluorescent coating 1014 in the form of grid lines. The space between each fluorescence dot 1012 (FIG. 48) or line 1014 (FIG. 49) can be varied according to user needs.

The fluorescent dots or lines can be made with a single or several fluorescent materials/slide so as to emit fluorescence signals filters of different wavelengths as desired by user. The fluorescent coating is preferably transparent under normal light, but semi transparent or opaque fluorescence coatings can also be used.

The operation of the slides of FIGS. 48-49 is described. A specimen, stained or unstained with a fluorescent stain, is placed on the fluorescent slide and observed under the fluorescence microscope using a suitable filter under exciting light such as ultraviolet light. The points of fluorescence produced by the fluorescent dots or lines in the fluorescent slide, act as tiny sources of light underneath the specimen thereby throwing the specimen into relief by the background lighting and thus increasing contrast in the specimen.

What is claimed is:

1. An apparatus for collecting aquatic animal eggs comprising:
   a plurality of tanks for containing animals that are capable of laying eggs, each tank including a spout for enabling fluid to flow out of the tank;
   a rack having a plurality of level sections for supporting the tanks, wherein at least one of the level sections is stepped down from another level section;
   a fluid conduit assembly for introducing a fluid into the plurality of tanks to flow out the spouts of each tank;

a plurality of stepped drains in fluid communication with the spouts of the tanks; and at least one removable net operatively coupled in-line with a fluid flow from at least one tank to capture the eggs from the at least one tank.

2. The apparatus of claim 1 wherein the at least one removable net is placed over an opening defined in a stepped drain.

3. The apparatus of claim 1 wherein the at least one removable net is placed inside the spouts of the tanks.

4. The apparatus of claim 1 wherein the at least one removable net further comprises a handle for grasping by a user.

5. The apparatus of claim 1 wherein the stepped drains further include holes configured to receive studs formed along a rim of each removable net.

6. The apparatus of claim 1 wherein the at least one removable net includes a rim having flaps for grasping by a user.

7. The apparatus of claim 1 wherein the at least one removable net includes arms for suspending the nets from the stepped drains.

8. The apparatus of claim 1 wherein the at least one removable net is configured for placing over the spout to clasp the spout and strain water from the spout.

9. The apparatus of claim 1 wherein the plurality of tanks further include barriers positioned on the inside of the plurality of tanks.

10. The apparatus of claim 1 further including a plurality of removable nets.

11. A method for collecting eggs from aquatic animals comprising:

providing a plurality of tanks for holding animals that are capable of laying eggs, and a fluid conduit assembly for circulating fluid through the tanks, the fluid conduit assembly including a plurality of movable nets, each movable net corresponding to a tank;

positioning each movable net to strain fluid flow from a particular tank; and selectively moving the movable nets to either isolate or combine the fluid flowing out of the tanks to selectively collect the eggs from one or more of the tanks.

12. The method of claim 11 wherein the plurality of tanks are placed on different levels wherein the eggs of each isolated level are collected separately.

* * * * *